US012277911B2

(12) United States Patent
Kim et al.

(10) Patent No.: US 12,277,911 B2
(45) Date of Patent: Apr. 15, 2025

(54) SCAN DRIVING CIRCUIT AND DISPLAY DEVICE INCLUDING THE SAME

(71) Applicant: SAMSUNG DISPLAY CO., LTD., Yongin-si (KR)

(72) Inventors: Taehoon Kim, Hwaseong-si (KR); Joon-Chul Goh, Suwon-si (KR); Soon-Dong Kim, Osan-si (KR); Hae-Kwan Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/586,408

(22) Filed: Feb. 23, 2024

(65) Prior Publication Data

US 2024/0194153 A1 Jun. 13, 2024

Related U.S. Application Data

(63) Continuation of application No. 18/179,345, filed on Mar. 6, 2023, now Pat. No. 11,915,658, which is a continuation of application No. 17/354,857, filed on Jun. 22, 2021, now Pat. No. 11,600,231.

(30) Foreign Application Priority Data

Jun. 26, 2020 (KR) ........................ 10-2020-0078741

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2300/0819* (2013.01); *G09G 2310/0213* (2013.01); *G09G 2330/021* (2013.01)

(58) Field of Classification Search
CPC ............... G09G 3/3266; G09G 3/3233; G09G 2310/0286; G09G 2310/0267; G09G 2310/0264; G09G 2310/0281
See application file for complete search history.

(56) References Cited

U.S. PATENT DOCUMENTS

| | | | |
|---|---|---|---|
| 8,089,446 | B2 | 1/2012 | Pak et al. |
| 8,264,426 | B2 | 9/2012 | Chung |
| 9,105,329 | B2 | 8/2015 | Yoon |

(Continued)

FOREIGN PATENT DOCUMENTS

| | | | |
|---|---|---|---|
| CN | 101136185 | A | 3/2008 |
| CN | 103578394 | A | 2/2014 |

(Continued)

OTHER PUBLICATIONS

Chinese Office Action dated Feb. 24, 2025, issued in corresponding Chinese Patent Application No. 202110666723.5, 10 pages.

*Primary Examiner* — Koosha Sharifi-Tafreshi
(74) *Attorney, Agent, or Firm* — Womble Bond Dickinson (US) LLP

(57) ABSTRACT

A scan driving circuit includes: a driving circuit configured to output a scan signal to an output terminal in response to clock signals and a carry signal; and a masking circuit configured to stop the driving circuit from outputting the scan signal in response to a masking signal and a signal indicating an operating state of the driving circuit.

19 Claims, 16 Drawing Sheets

(56) References Cited

U.S. PATENT DOCUMENTS

| | | | | |
|---|---|---|---|---|
| 9,418,755 | B2 | 8/2016 | So et al. | |
| 9,847,054 | B2 * | 12/2017 | Hwang | G09G 3/3266 |
| 9,886,891 | B2 | 2/2018 | In et al. | |
| 9,928,796 | B2 | 3/2018 | Nakatani et al. | |
| 9,972,265 | B2 | 5/2018 | Na et al. | |
| 10,831,305 | B2 | 11/2020 | Zhang | |
| 11,238,769 | B2 | 2/2022 | Wang et al. | |
| 2011/0141091 | A1 | 6/2011 | Eom | |
| 2015/0243203 | A1 | 8/2015 | Kim et al. | |
| 2016/0042707 | A1 | 2/2016 | Wang et al. | |
| 2016/0351160 | A1 * | 12/2016 | In | G09G 3/3225 |
| 2017/0116949 | A1 * | 4/2017 | Lee | G09G 3/3677 |
| 2018/0075809 | A1 | 3/2018 | Chang et al. | |
| 2020/0402464 | A1 | 12/2020 | Seo et al. | |
| 2021/0407399 | A1 | 12/2021 | Kim et al. | |
| 2021/0407429 | A1 | 12/2021 | Seo et al. | |
| 2022/0020327 | A1 | 1/2022 | Cho et al. | |

FOREIGN PATENT DOCUMENTS

| | | | |
|---|---|---|---|
| CN | 106663409 | A | 5/2017 |
| CN | 108806571 | A | 11/2018 |
| CN | 110517633 | A | 11/2019 |
| CN | 110534048 | A | 12/2019 |
| EP | 1662463 | A2 | 5/2006 |
| KR | 10-0667075 | B1 | 1/2007 |
| KR | 10-2014-0072662 | A | 6/2014 |
| KR | 10-2016-0045215 | A | 4/2016 |
| KR | 10-2020-0144632 | A | 12/2020 |
| KR | 10-2022-0000022 | A | 1/2022 |
| KR | 10-2022-0001032 | A | 1/2022 |
| KR | 10-2022-0008951 | A | 1/2022 |

* cited by examiner

SCAN DRIVING CIRCUIT AND DISPLAY DEVICE INCLUDING THE SAME

CROSS-REFERENCE TO RELATED APPLICATIONS

This application is a continuation of U.S. patent application Ser. No. 18/179,345, filed Mar. 6, 2023, which is a continuation of U.S. patent application Ser. No. 17/354,857, filed Jun. 22, 2021, now U.S. Pat. No. 11,600,231, which claims priority to and the benefit of Korean Patent Application No. 10-2020-0078741, filed Jun. 26, 2020, the entire content of all of which is incorporated herein by reference.

BACKGROUND

1. Field

Aspects of some embodiments of the present disclosure herein relate to a display device.

2. Description of the Related Art

Among display devices, an organic light emitting display device displays images using an organic light emitting diode that generates light by recombination of electrons and holes. Organic light emitting display devices generally have a relatively fast response speed and are driven with relatively low power consumption.

An organic light emitting display device generally includes pixels connected to data lines and scan lines. Pixels generally include an organic light emitting diode and a circuit unit for controlling an amount of current flowing through the organic light emitting diode. The circuit unit controls the amount of current flowing from the first driving voltage to the second driving voltage through the organic light emitting diode in response to the data signal. In this case, light (e.g., with a set or predetermined luminance) is generated in response to the amount of current flowing through the organic light emitting diode.

As the application field of a display device becomes more diversified, a plurality of different images may be displayed on a single display device. There is a desire for a technology to reduce power consumption of a display device displaying a plurality of images.

The above information disclosed in this Background section is only for enhancement of understanding of the background and therefore the information discussed in this Background section does not necessarily constitute prior art.

SUMMARY

Aspects of some embodiments of the present disclosure herein relate to a display device, and for example, to a display device including a scan driving circuit.

Aspects of some embodiments of the inventive concept include a scan driving circuit capable of reducing power consumption and a display device including the same.

According to some embodiments of the inventive concept, a scan driving circuit includes: a driving circuit configured to output a scan signal to an output terminal in response to clock signals and a carry signal; and a masking circuit configured to stop the driving circuit from outputting the scan signal in response to a masking signal and a signal indicating an operating state of the driving circuit.

According to some embodiments, the signal indicating the operating state of the driving circuit may be any one of the carry signal and the scan signal.

According to some embodiments, the driving circuit may include: a first transistor configured to transmit the carry signal to a first node in response to a first clock signal among the clock signals; and a second transistor connecting the output terminal to a first voltage terminal receiving a first voltage in response to a signal of the first node.

According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to the output terminal.

According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to an input terminal receiving the carry signal.

According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to the first node.

According to some embodiments, the driving circuit may further include: a third transistor connected between a second voltage terminal receiving a second voltage and the output terminal and including a gate electrode connected to a second node; and a fourth transistor connected between the second voltage terminal and the second node and including a gate electrode connected to the first node.

According to some embodiments, the masking circuit may include: a first switch electrically connecting a first terminal receiving a first voltage and a second terminal in response to the scan signal; and a second switch electrically connecting an input terminal receiving the carry signal and the second terminal of the first switch in response to the masking signal.

According to some embodiments, the masking circuit may include: a first logic circuit configured to receive the scan signal and the carry signal; a second logic circuit configured to receive the carry signal and the masking signal; and a third logic circuit configured to receive an output signal of the first logic circuit and an output signal of the second logic circuit and provide the carry signal to the driving circuit.

According to some embodiments, the masking circuit may include: a first logic circuit configured to receive the masking signal and the scan signal output from the driving circuit; a second logic circuit configured to invert and output the masking signal; a third logic circuit configured to receive the scan signal output from the driving circuit, an inverted masking signal output from the second logic circuit, and an output scan signal; and a fourth logic circuit configured to receive an output signal of the first logic circuit and an output signal of the second logic circuit and output the output scan signal.

According to some embodiments of the inventive concept, a display device includes: a display panel including a plurality of pixels respectively connected to a plurality of data lines and a plurality of scan lines; a data driving circuit configured to drive the plurality of data lines; a scan driving circuit configured to drive the plurality of scan lines; and a driving controller configured to receive an image signal and a control signal and to control the data driving circuit and the scan driving circuit to display an image on the display panel, wherein the driving controller divides the display panel into a first display area and a second display area based on the image signal, and outputs a masking signal indicating a start point of the second display area, wherein the scan driving circuit includes a plurality of driving stages each driving a corresponding scan line among the plurality of scan lines, wherein each of the plurality of driving stages includes: a driving circuit configured to output a scan signal to an output terminal in response to clock signals and a carry signal from the driving controller; and a masking circuit configured to stop the driving circuit from outputting the scan signal in response to the masking signal and a signal indicating an operating state of a corresponding driving stage among the plurality of driving stages.

According to some embodiments, the signal indicating the operating state of the corresponding driving stage may be any one of the carry signal and the scan signal.

According to some embodiments, the scan signal output from a j-th driving stage among the plurality of driving stages may be provided as a carry signal of the (j+k)-th driving stage (j, k are natural numbers).

According to some embodiments, each of the plurality of driving stages may include: a first transistor configured to transmit the carry signal to a first node in response to a first clock signal among the clock signals; and a second transistor connecting the output terminal to a first voltage terminal receiving a first voltage in response to a signal from the first node According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to the output terminal.

According to some embodiments, when a start point of the second display area corresponds to a j-th scan line, the masking signal may transition to a level of turning on the first masking transistor while a (j−1)-th scan signal is at an active level and a j-th scan signal is at an inactive level.

According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to an input terminal receiving the carry signal.

According to some embodiments, when a start point of the second display area corresponds to a j-th scan line, the masking signal may transition to a level of turning on the first masking transistor while a (j−2)-th scan signal is at an active level and a (j−1)-th scan signal is at an inactive level.

According to some embodiments, the masking circuit may include: a first masking transistor connected between the first node and a masking node and including a gate electrode connected to an input terminal receiving the masking signal; and a second masking transistor connected between the masking node and the first voltage terminal and including a gate electrode connected to the first node.

According to some embodiments, the driving circuit further may include: a third transistor connected between a second voltage terminal receiving a second voltage and the output terminal and including a gate electrode connected to a second node; and a fourth transistor connected between the second voltage terminal and the second node and including a gate electrode connected to the first node.

According to some embodiments, the masking circuit may include: a first switch electrically connecting a first terminal receiving a first voltage and a second terminal in response to the scan signal; and a second switch electrically connecting an input terminal receiving the carry signal and the second terminal of the first switch in response to the masking signal.

According to some embodiments, the masking circuit may include: a first logic circuit configured to receive the scan signal and the carry signal; a second logic circuit configured to receive the carry signal and the masking signal; and a third logic circuit configured to receive an output signal of the first logic circuit and an output signal of the second logic circuit and provide the carry signal to the driving circuit.

According to some embodiments, the masking circuit may include: a first logic circuit configured to receive the masking signal and the scan signal output from the driving circuit; a second logic circuit configured to invert and output the masking signal; a third logic circuit configured to receive the scan signal output from the driving circuit, the inverted masking signal output from the second logic circuit, and an output scan signal; and a fourth logic circuit configured to receive an output signal of the first logic circuit and an output signal of the second logic circuit and output the output scan signal.

BRIEF DESCRIPTION OF THE DRAWINGS

The accompanying drawings are included to provide a further understanding of embodiments according to the inventive concept, and are incorporated in and constitute a part of this specification. The drawings illustrate aspects of some embodiments of the inventive concept and, together with the description, serve to explain principles of some embodiments of the inventive concept. In the drawings.

DETAILED DESCRIPTION

Figure 1:
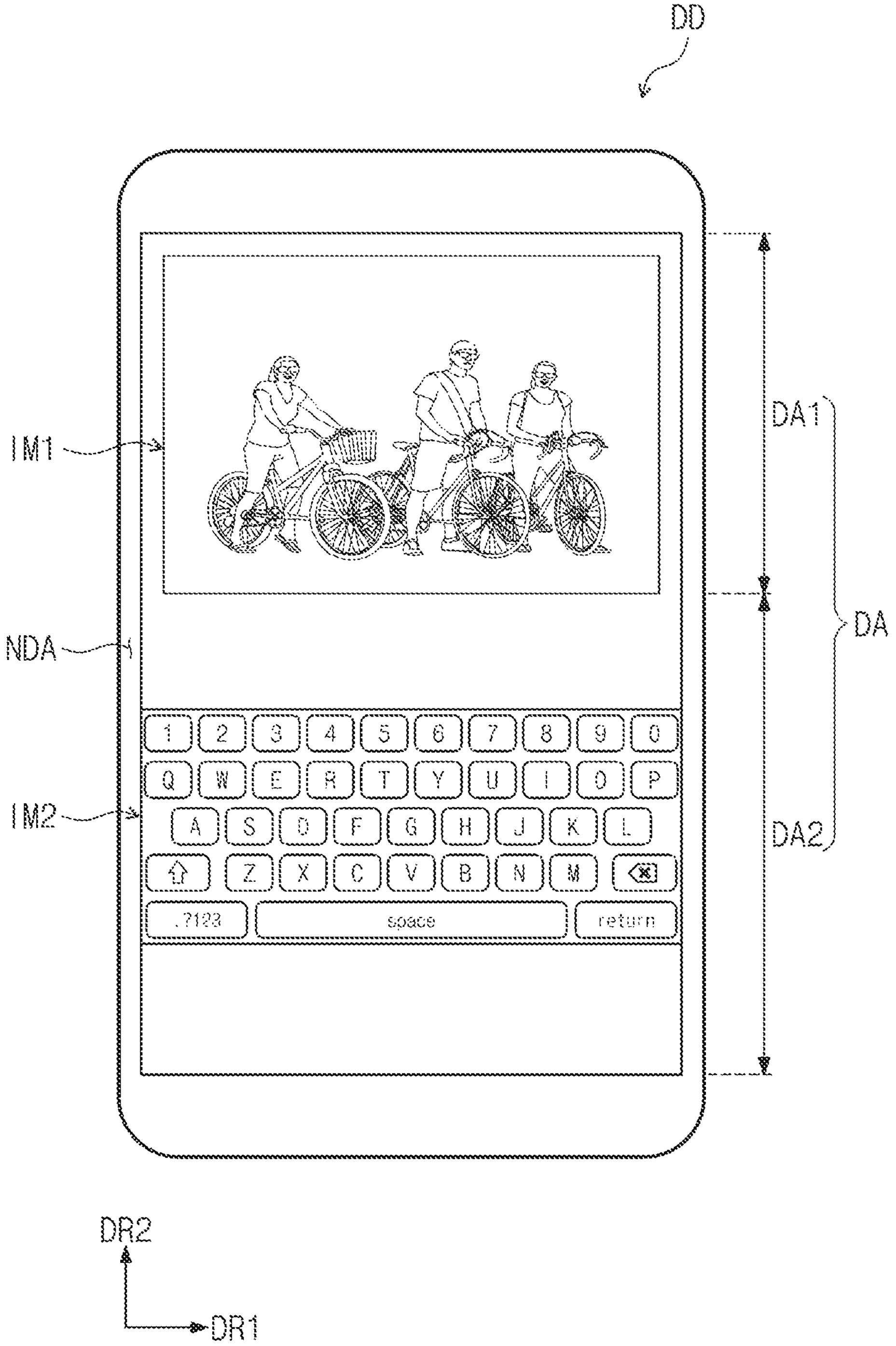
FIG. 1 is a perspective view of a display device according to some embodiments of the inventive concept.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. In one embodiment, for example, a first component may be referred to as a second component and vice versa without departing from the scope of the inventive concept. The terms of a singular form may include plural forms unless otherwise specified.

In addition, terms such as "below", "the lower side", "on", and "the upper side" are used to describe a relationship of configurations shown in the drawing. The terms are described as a relative concept based on a direction shown in the drawing.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as terms commonly understood by those skilled in the art to which this invention belongs. In general, the terms defined in the dictionary should be considered to have the same meaning as the contextual meaning of the related art, and, unless clearly defined herein, should not be understood abnormally or as having an excessively formal meaning.

Hereinafter, aspects of some embodiments of the inventive concept will be described in more detail with reference to the drawings.

FIG. 1 is a perspective view of a display device according to some embodiments of the inventive concept.

Referring to FIG. 1, a portable terminal is illustrated as a of a display device DD according to some embodiments of the inventive concept. The portable terminal may include a tablet PC, a smart phone, a Personal Digital Assistant (PDA), a Portable Multimedia Player (PMP), a game console, a wristwatch type electronic device, and the like. However, embodiments according to the inventive concept are not limited thereto. The inventive concept may be used for large-sized electronic equipment such as a TV or an external billboard, and may also be used for small-sized electronic equipment such as a personal computer, a notebook computer, kiosks, a car navigation unit, and a camera. These are simply suggested as embodiments and it is obvious that they are employed in other electronic devices without departing from the scope of the inventive concept.

As shown in FIG. 1, the display surface on which a first image IM1 and a second image IM2 are displayed is parallel to a plane defined by a first direction DR1 and a second direction DR2. The display device DD includes a plurality of areas that are distinguished on the display surface. The display surface includes a display area DA in which the first and second images IM1 and IM2 are displayed, and a non-display area NDA adjacent to the display area DA. The non-display area NDA may be referred to as a bezel area. As one example, the display area DA may have a rectangular form. The non-display area NDA may surround the display area DA. Also, according to some embodiments, for example, the display device DD may have a partially curved shape. As a result, one area of the display area DA can have a curved shape.

The display area DA of the display device DD includes a first display area DA1 and a second display area DA2. In a specific application program, the first image IM1 may be displayed in the first display area DA1 and the second image IM2 may be displayed in the second display area DA2. According to some embodiments, for example, the first image IM1 may be a moving image, and the second image IM2 may be a still image or text information having a long change period.

The display device DD according to some embodiments may drive the first display area DA1 in which a moving image is displayed at a normal frequency, and drive the second display area DA2 in which a still image is displayed at a lower frequency than the normal frequency. The display device DD may reduce power consumption by lowering the driving frequency of the second display area DA2.

The sizes of each of the first and second display areas DA1 and DA2 may be preset sizes, and may be changed by an application program. According to some embodiments, when the first display area DA1 displays a still image and the second display area DA2 displays a moving image, the first display area DA1 may be driven at a low frequency, and the second display area DA2 may be driven at a normal frequency. In addition, the display area DA may be divided into three or more display areas, and a driving frequency of each of the display areas may be determined according to the type of image (e.g., still image or moving image) displayed in each of the display areas.

Figure 2:
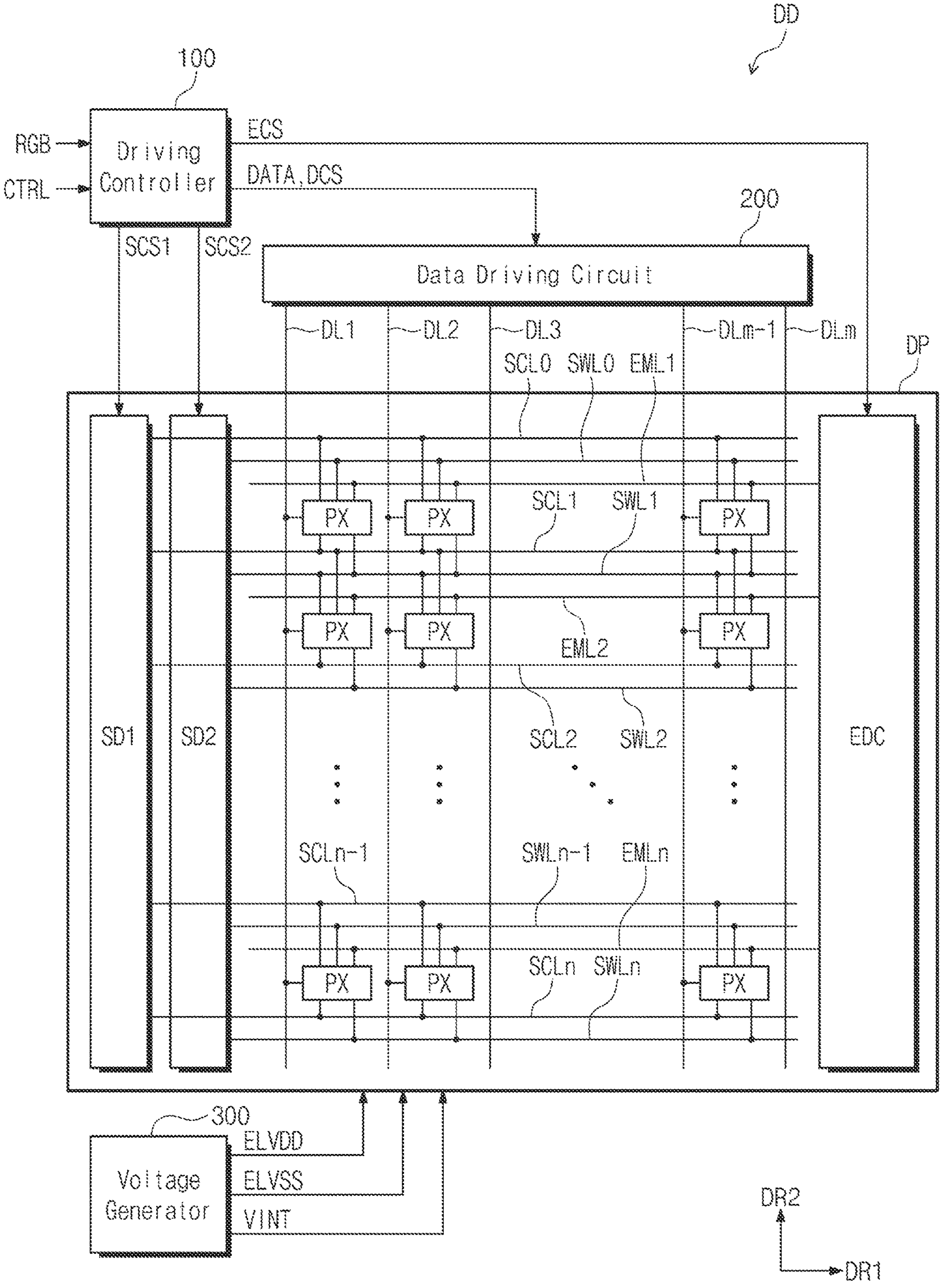
FIG. 2 is a block diagram illustrating a display device according to some embodiments of the inventive concept.

FIG. 2 is a block diagram illustrating a display device according to some embodiments of the inventive concept.

Referring to FIG. 2, the display device DD includes a display panel DP, a driving controller 100, a data driving circuit 200, and a voltage generator 300.

The driving controller 100 receives an image signal RGB and a control signal CTRL. The driving controller 100 generates an image data signal DATA obtained by converting a data format of the image signal RGB to meet the specification of an interface with the data driving circuit 200. The driving controller 100 outputs a first scan control signal SCS1, a second scan control signal SCS2, a light emitting control signal ESC, and a data control signal DCS.

The data driving circuit 200 receives a data control signal DCS and an image data signal DATA from the driving controller 100. The data driving circuit 200 converts the image data signal DATA into data signals, and outputs the data signals to a plurality of data lines DL1 to DLm to be described later. The data signals are analog voltages corresponding to gradation values of the image data signal DATA.

The voltage generator 300 generates voltages necessary for the operation of the display panel DP. According to some embodiments, the voltage generator 300 generates a first driving voltage ELVDD, a second driving voltage ELVSS, and an initialization voltage VINT. According to some embodiments, the voltage generator 300 may operate under the control of the driving controller 100.

The display panel DP includes a first scan driving circuit SD1, a second scan driving circuit SD2, a light emitting driving circuit EDC, scan lines SCL0 to SCLn, scan lines SWL0 to SWLn, light emitting control lines EML1 to EMLn, data lines DL1 to DLm, and pixels PX. According to some embodiments, the first scan driving circuit SD1 is arranged on the first side of the display panel DP.

The scan lines SCL0 to SCLn extend in a first direction DR1 from the first scan driving circuit SD1. The scan lines SWL0 to SWLn extend in the first direction DR1 from the second scan driving circuit SD2. The light emitting control lines EML1 to EMLn extend in a direction opposite to the first direction DR1 from the light emitting driving circuit EDC. The scan lines SCL0 to SCLn, the scan lines SWL0 to SWLn, and the light emitting control lines EML1 to EMLn are arranged to be spaced apart from each other in the second direction DR2. The data lines DL1 to DLm extend in a direction opposite to the second direction DR2 from the data driving circuit 200 and are arranged to be spaced apart from each other in the first direction DR1.

Each of the plurality of pixels PX is electrically connected to two corresponding scan lines among the scan lines SCL0 to SCLn and two corresponding scan lines among the scan lines SWL0 to SWLn. In addition, each of the plurality of pixels PX is electrically connected to a corresponding one of the light emitting control lines EML1 to EMLn and a corresponding one of the data lines DL1 to DLm, respectively. According to some embodiments, for example, as shown in FIG. 2, pixels PX in the first row may be connected to scan lines SCL0 and SCL1 and scan lines SWL0 and SWL1. Also, the pixels PX in the second row may be connected to the scan lines SCL1 and SCL2 and the scan lines SWL1 and SWL2.

Each of the plurality of pixels PX includes an organic light emitting diode ED (refer to FIG. 3) and a pixel circuit unit PXC (refer to FIG. 3) that controls light emission of the organic light emitting diode ED. The pixel circuit unit PXC may include a plurality of transistors and a capacitor. The first scan driving circuit SD1, the second scan driving circuit SD2, and the light emitting driving circuit EDC may include transistors formed through the same process as the pixel circuit unit.

Each of the pixels PX receives a first driving voltage ELVDD, a second driving voltage ELVSS, and an initialization voltage VINT.

The first scan driving circuit SD1 receives the first scan control signal SCS1 from the driving controller 100. The first scan driving circuit SD1 may output scan signals to the scan lines SCL0 to SCLn in response to the first scan control signal SCS1. The second scan driving circuit SD2 receives the second scan control signal SCS2 from the driving controller 100. The second scan driving circuit SD2 may output scan signals to the scan lines SWL0 to SWLn in response to the second scan control signal SCS2. The light emitting driving circuit EDC may output light emitting control signals to the light emitting control lines EML1 to EMLn in response to the light emitting control signal ECS.

The circuit configuration and operation of the first scan driving circuit SD1 will be described in more detail later.

It is shown and described with reference to FIG. 2 that the first scan driving circuit SD1 outputs scan signals to the scan lines SCL0 to SCLn, the second scan driving circuit SD2 outputs scan signals to the scan lines SWL0 to SWLn, and the light emitting driving circuit EDC outputs light emitting control signals to the light emitting control lines EML1 to EMLn. However, embodiments according to the inventive concept are not limited thereto. According to some embodiments, for example, the first scan driving circuit SD1 and the second scan driving circuit SD2 are configured as a single circuit, or the first scan driving circuit SD1, the second scan driving circuit SD2, and the light emitting driving circuit EDC may be configured as a single circuit.

The driving controller 100 according to some embodiments divides the display panel DP into the first display area DA1 (refer to FIG. 1) and the second display area DA2 (refer to FIG. 1) based on the image signal RGB, and outputs at least one masking signal indicating the start point of the second display area DA2. At least one masking signal may be included in each of the first scan control signal SCS1.

The first scan driving circuit SD1 and the second scan driving circuit SD2 according to some embodiments may drive scan lines corresponding to the first display area DA1 among the scan lines SCL0 to SCLn at a first driving frequency in response to the first scan control signal SCS1, and drive scan lines corresponding to the second display area DA2 at a second driving frequency different from the first driving frequency.

Figure 3:
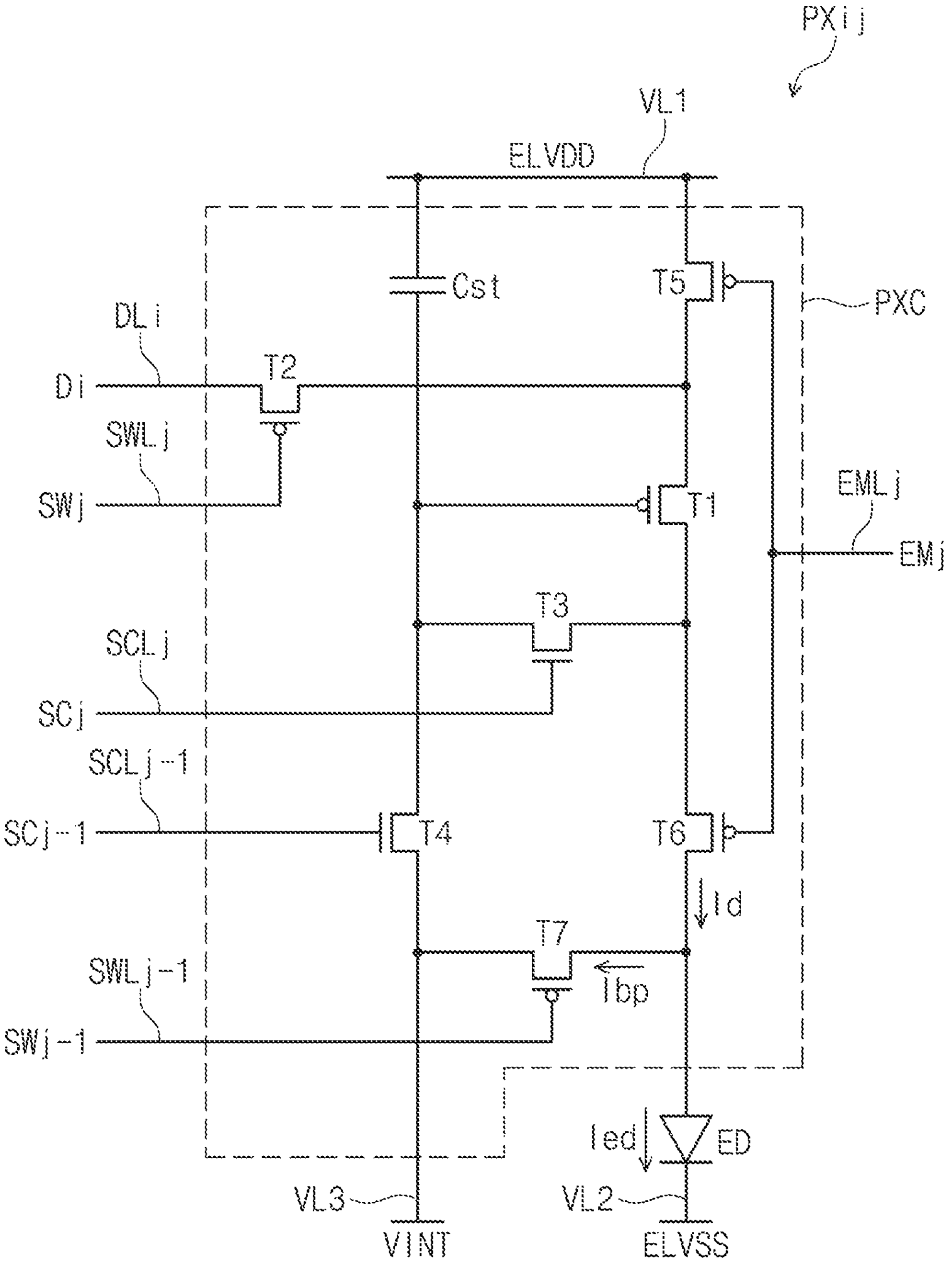
FIG. 3 is an equivalent circuit diagram of a pixel according to some embodiments of the inventive concept.

FIG. 3 is an equivalent circuit diagram of a pixel according to some embodiments of the inventive concept.

FIG. 3 shows an equivalent circuit diagram of a pixel PXij connected to the i-th data line DLi among the data lines DL1 to DLm shown in FIG. 2, the (j−1)-th scan line SCLj−1, and the j-th scan line SCLj among the scan lines SCL0 to SCLn, the (j−1)-th scan line SWLj−1, and the j-th scan line SWLj among the scan lines SWL0 to SWLn, and the j-th light emitting control line EMLj among the light emitting control lines EML1 to EMLn.

According to some embodiments, the pixel circuit unit PXC of the pixel PXij includes first to seventh transistors T1 to T7 and one capacitor Cst. Each of the first, second, fifth, sixth, and seventh transistors T1, T2, T5, T6, and T7 is a P-type transistor having a low-temperature polycrystalline silicon (LTPS) semiconductor layer, and each of the third and fourth transistors T3 and T4 is an N-type transistor having an oxide semiconductor as a semiconductor layer. However, embodiments according to the inventive concept are not limited thereto, and all of the first to seventh transistors T1 to T7 may be N-type transistors or P-type transistors. According to some embodiments, at least one of the first to seventh transistors T1 to T7 may be an N-type transistor, and the other may be a P-type transistor. In addition, the pixel circuit unit PXC shown in FIG. 3 is only an example, and the circuit configuration of the pixel circuit unit PXC may be modified and implemented.

Referring to FIG. 3, a pixel PXij of the display device according to some embodiments includes at least one organic light emitting diode ED. According to some embodiments, an example in which one pixel PXij includes one organic light emitting diode ED is described, but embodiments according to the inventive concept are not limited thereto.

Figure 4:
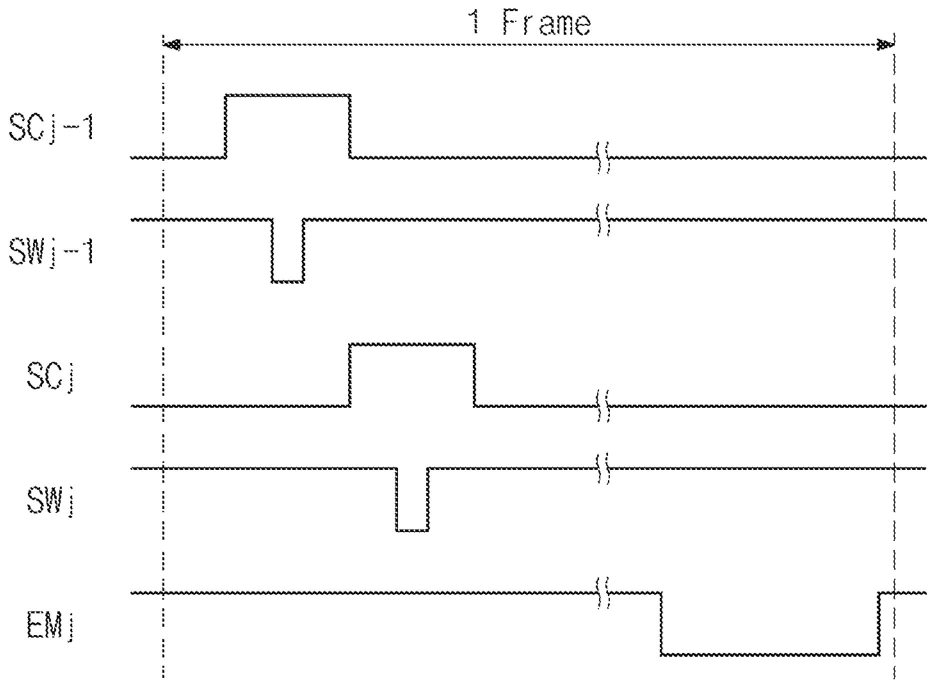
FIG. 4 is a timing diagram illustrating an operation of a pixel shown in FIG. 3.

For convenience of description, in the description of FIGS. 3 and 4, the (j−1)-th scan line SCLj−1, the j-th scan line SCLj, the (j−1)-th scan line SWLj−1, the j-th scan line SWLj, and the j-th light emitting control line EMLj are referred to as a first scan line SCLj−1, a second scan line SCLj, a third scan line SWLj−1, a fourth scan line SWLj, and a light emitting control line EMLj, respectively.

The first to fourth scan lines SCLj−1, SCLj, SWLj−1, and SWLj may transmit the first to fourth scan signals SCj−1, SCj, SWj−1, and SWj, respectively. The first scan signal SCj−1 may turn on/off the fourth transistor T4. The second scan signal SCj may turn on/off the third transistor T3. The third scan signal SWj−1 may turn on/off the seventh transistor T7. The fourth scan signal SWj may turn on/off the second transistor T2.

The light emitting control line EMLj may transmit a light emitting control signal EMj capable of controlling light emission of the organic light emitting diode ED included in the pixel PXij. The light emitting control signal EMj transmitted by the light emitting control line EMLj may have a different waveform from the first to fourth scan signals SCj−1, SCj, SWj−1, and SWj. The data line DLi transmits the data signal Di. The data signal Di may have a voltage level corresponding to the image signal RGB inputted to the display device DD (refer to FIG. 2). The first to third driving voltage lines VL1, VL2, and VL3 may transmit a first driving voltage ELVDD, a second driving voltage ELVSS, and an initialization voltage VINT, respectively.

The first transistor T1 includes a first electrode connected to the first driving voltage line VL1 through the fifth transistor T5, a second electrode electrically connected to the anode of the organic light emitting diode ED through the sixth transistor T6, and a gate electrode connected to one end of the capacitor Cst. The first transistor T1 may receive the data signal Di transmitted from the data line DLi according to the switching operation of the second transistor T2 and may supply the driving current Id to the organic light emitting diode ED.

The second transistor T2 includes a first electrode connected to the data line DLi, a second electrode connected to the first electrode of the first transistor T1, and a gate electrode connected to the fourth scan line SWLj. The second transistor T2 may be turned on according to the fourth scan signal SWj received through the fourth scan line SWLj, and thus transmit the data signal Di transmitted from the data line DLi to the first electrode of the first transistor T1.

The third transistor T3 includes a first electrode connected to the gate electrode of the first transistor T1, a second electrode connected to the second electrode of the first transistor T1, and a gate electrode connected to the second scan line SCLj. The third transistor T3 may be turned on according to the second scan signal SCj received through the second scan line SCLj, and thus diode-connect the first transistor T1 by connecting the gate electrode and the second electrode of the first transistor T1 to each other.

The fourth transistor T4 includes a first electrode connected to the gate electrode of the first transistor T1, a second electrode connected to the third voltage line VL3 through which the initialization voltage VINT is transmitted, and a gate electrode connected to the first scan line SCLj−1. The fourth transistor T4 may be turned on according to the first scan signal SCj−1 received through the first scan line SCLj−1, and thus perform an initialization operation of initializing the voltage of the gate electrode of the first transistor T1 by transmitting the initialization voltage VINT to the gate electrode of the first transistor T1.

The fifth transistor T5 includes a first electrode connected to the first driving voltage line VL1, a second electrode connected to the first electrode of the first transistor T1, and a gate electrode connected to the light emitting control line EMLj.

The sixth transistor T6 includes a first electrode connected to the second electrode of the first transistor T1, a second electrode connected to the anode of the organic light emitting diode ED, and a gate electrode connected to the light emitting control line EMLj.

The fifth transistor T5 and the sixth transistor T6 are simultaneously turned on according to the light emitting control signal EMj received through the light emitting control line EMLj such that through this, the first driving voltage ELVDD may be compensated through the diode-connected first transistor T1 and transmitted to the organic light emitting diode ED.

The seventh transistor T7 includes a first electrode connected to the second electrode of the fourth transistor T4, a second electrode connected to the second electrode of the sixth transistor T6, and a gate electrode connected to the third scan line SWLj−1.

As described above, one end of the capacitor Cst is connected to the gate electrode of the first transistor T1, and the other end is connected to the first driving voltage line VL1. The cathode of the organic light emitting diode ED may be connected to the second driving voltage line VL2 transmitting the second driving voltage ELVSS. The structure of the pixel PXij according to some embodiments is not limited to the structure shown in FIG. 3, and the number of transistors, the number of capacitors, and the connection relation in one pixel PXij may be variously modified.

FIG. 4 is a timing diagram illustrating an operation of a pixel PXij shown in FIG. 3. An operation of the display device according to some embodiments will be described in more detail with reference to FIGS. 3 and 4.

Referring to FIGS. 3 and 4, a high level first scan signal SCj−1 is supplied through a first scan line SCLj−1 during an initialization period within one frame. The fourth transistor T4 is turned on in response to the high-level first scan signal SCj−1, and the initialization voltage VINT is transmitted to the gate electrode of the first transistor T1 through the fourth transistor T4, so that the first transistor T1 is initialized.

Meanwhile, the seventh transistor T7 is turned on by receiving the low-level third scan signal SWj−1 through the third scan line SWLj−1. A part of the driving current Id may be passed through the seventh transistor T7 as the bypass current Ibp by the seventh transistor T7.

Even when the minimum current of the first transistor T1 for displaying a black image flows as the driving current, if the organic light emitting diode ED emits light, the black image is not properly displayed. Accordingly, the seventh transistor T7 in the pixel PXij according to some embodiments of the inventive concept may distribute a part of the minimum current of the first transistor T1 as the bypass current Ibp to a current path other than the current path toward the organic light emitting diode ED. Here, the minimum current of the first transistor T1 means a current under the condition that the first transistor T1 is turned off because the gate-source voltage Vgs of the first transistor T1 is smaller than the threshold voltage Vth. The minimum driving current (e.g., a current of 10 pA or less) under the condition that the first transistor T1 is turned off is transmitted to the organic light emitting diode ED to be expressed as a black luminance image. It may be said that when a minimum driving current for displaying a black image flows, the influence of bypass transmission of the bypass current Ibp is large, and when a large driving current for displaying an image such as a normal image or a white image flows, there is almost no influence of the bypass current Ibp. Therefore, when a driving current for displaying a black image flows, the light emission current Ied of the organic light emitting diode ED, which is reduced from the drive current Id by the amount of the bypass current Ibp exiting through the seventh transistor T7, may have a minimum current amount at a level that may reliably express a black image. Accordingly, an accurate black luminance image may be realized by using the seventh transistor T7, so that the contrast ratio may be improved. According to some embodiments, the bypass signal is the third scan signal SWj−1, but embodiments according to the present disclosure are not limited thereto.

Next, when the high level second scan signal SCj is supplied through the second scan line SCLj during the data programming and compensation period, the third transistor T3 is turned on. The first transistor T1 is diode-connected by the turned-on third transistor T3, and is biased in the forward direction. Also, the second transistor T2 is turned on by the low-level fourth scan signal SWj. Then, the compensation voltage Di-Vth, which is reduced by the threshold voltage Vth of the first transistor T1 from the data signal Di supplied from the data line DLi, is applied to the gate electrode of the first transistor T1. That is, the gate voltage applied to the gate electrode of the first transistor T1 may be the compensation voltage Di-Vth.

The first driving voltage ELVDD and the compensation voltage Di-Vth are applied to both ends of the capacitor Cst and the charge corresponding to the voltage difference between both ends may be stored in the capacitor Cst.

Next, during the light emission period, the light emitting control signal EMj supplied from the light emitting control line EMLj is changed from the high level to the low level. During the light emission period, the fifth transistor T5 and the sixth transistor T6 are turned on by the low-level light emitting control signal EMj. Then, a driving current Id corresponding to the voltage difference between the gate voltage of the gate electrode of the first transistor T1 and the first driving voltage ELVDD is generated, and the driving current Id is supplied to the organic light emitting diode ED through the sixth transistor T6 so that the light emission current Ied flows through the organic light emitting diode ED.

In FIG. 4, it is shown that the high level section of the first scan signal SCj−1 and the high level section of the second scan signal SCj do not overlap in time. According to some embodiments, a high level section of the first scan signal SCj−1 and a high level section of the second scan signal SCj may partially overlap.

Figure 5:
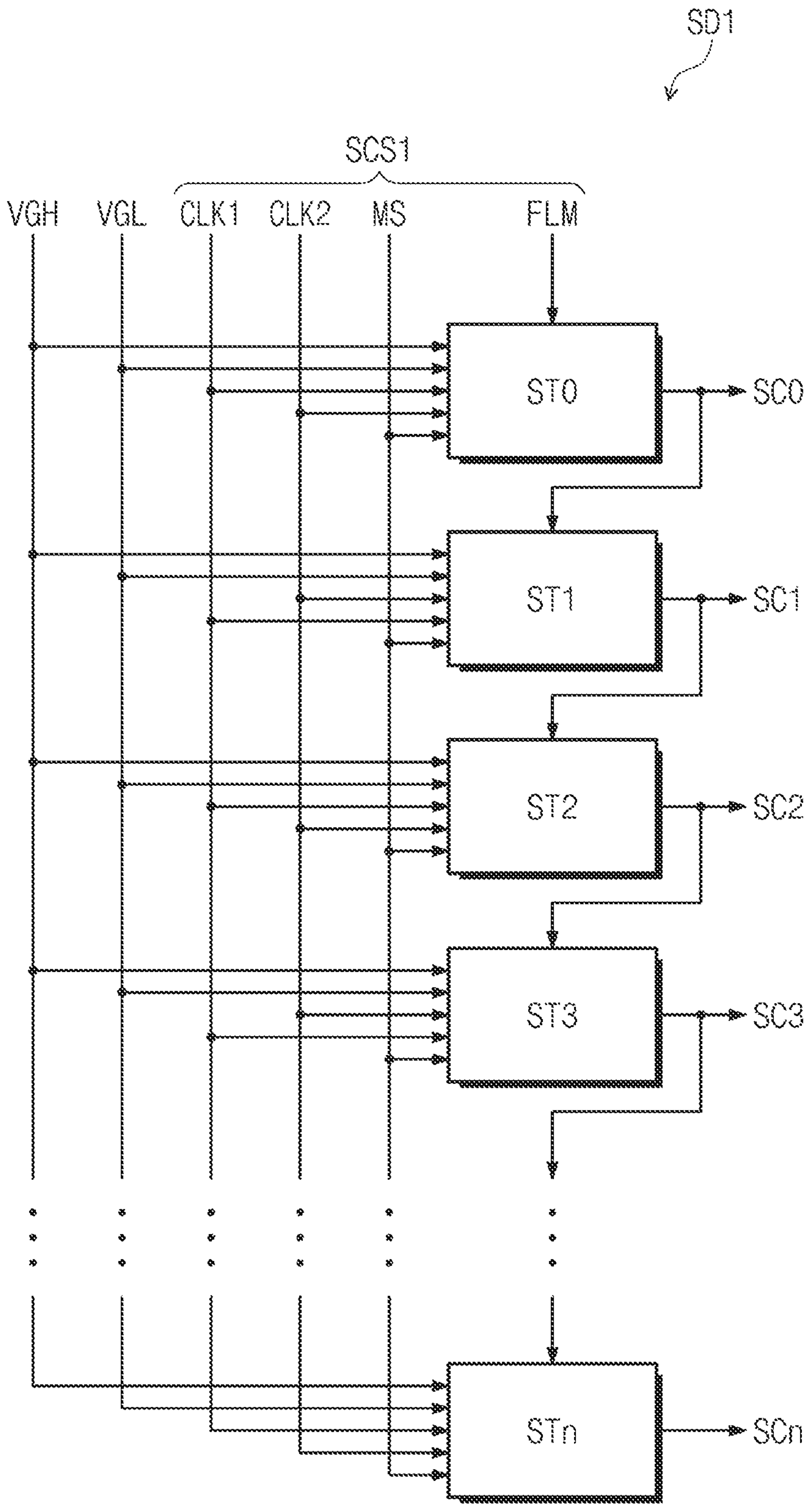
FIG. 5 is a block diagram of a scan driving circuit according to some embodiments of the inventive concept.

FIG. 5 is a block diagram of a first scan driving circuit SD1 according to some embodiments of the inventive concept.

Referring to FIG. 5, the first scan driving circuit SD1 includes driving stages ST0 to STn.

Each of the driving stages ST0 to STn receives a first scan control signal SCS1 from the driving controller 100 illustrated in FIG. 2. The first scan control signal SCS1 includes a start signal FLM, a first clock signal CLK1, a second clock signal CLK2, and a masking signal MS. Each of the driving stages ST0 to STn receives a first voltage VGL and a second voltage VGH. The first voltage VGL and the second voltage VGH may be provided from the voltage generator 300 illustrated in FIG. 2.

The masking signal MS is a signal for driving some of the driving stages ST0 to STn at a normal frequency and driving the rest at a low frequency. The masking signal MS may be commonly provided to all driving stages ST0 to STn in the first scan driving circuit SD1.

According to some embodiments, the driving stages ST0 to STn output scan signals SC0 to SCn. The scan signals SC0 to SCn may be provided to the scan lines SCL0 to SCLn shown in FIG. 2.

The driving stage ST0 may receive the start signal FLM as a carry signal. Each of the driving stages ST1 to STn has a dependent connection relationship in which a scan signal output from a previous driving stage is received as a carry signal. Among the driving stages ST1 to STn, the scan signal SCj output from the j-th driving stage STj may be provided as a carry signal of the (j+k)-th driving stage STj+k (j and k are natural numbers). According to some embodiments, for example, the driving stage ST1 receives the scan signal SC0 output from the previous driving stage ST0 as a carry signal, and the driving stage ST2 receives the scan signal SC1 output from the previous driving stage ST1 as a carry signal. FIG. 5 illustrates that the j-th driving stage STj receives the scan signal from the (j−1)-th driving stage STj−1 as a carry signal, but embodiments according to the inventive concept are not limited thereto.

Figure 6:
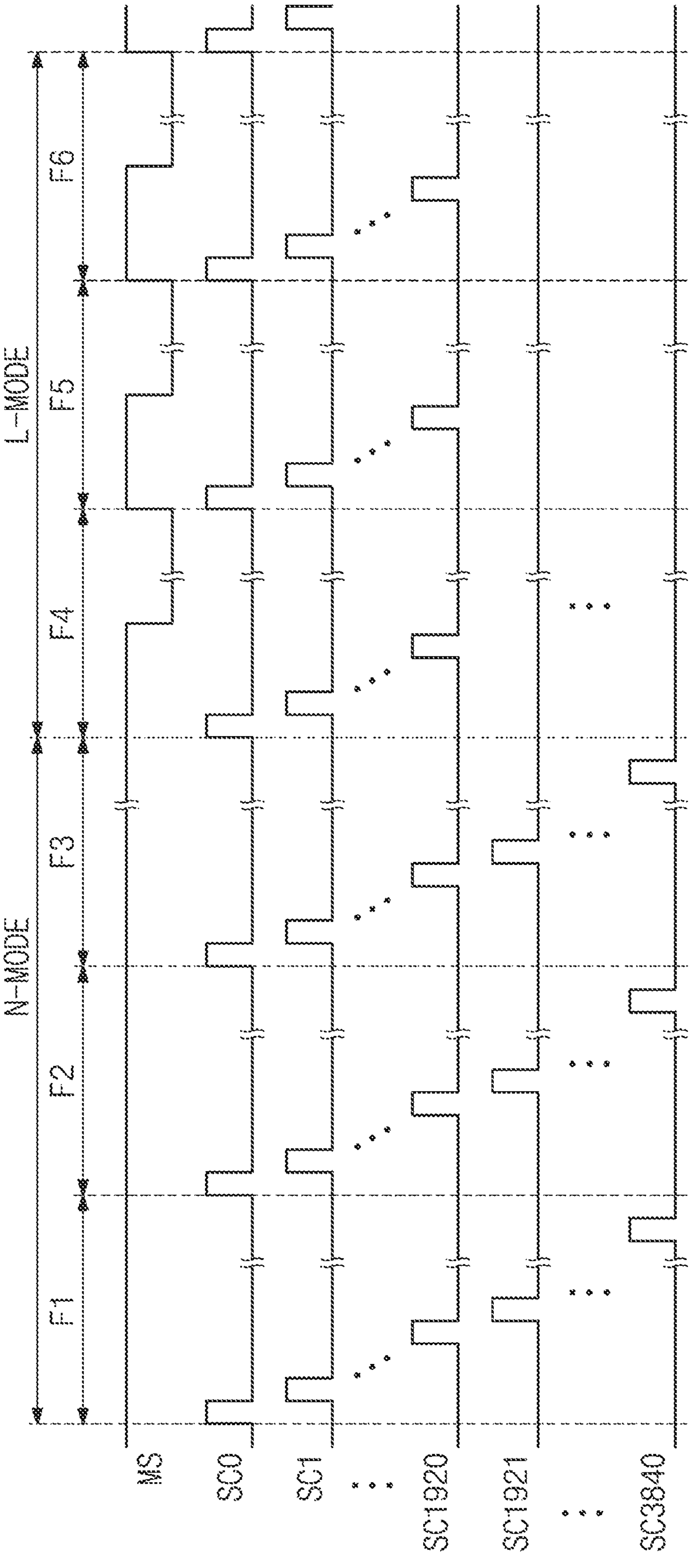
FIG. 6 is a diagram illustrating scan signals output from the scan driving circuit illustrated in FIG. 5 in a normal mode and a low power mode.

FIG. 6 is a diagram illustrating scan signals SC0 to SCn output from the first scan driving circuit SD1 illustrated in FIG. 5 in a normal mode and a low power mode.

Referring to FIGS. 5 and 6, the masking signal MS is maintained at a high level during the normal mode N-MODE. During the normal mode N-MODE, the driving stages ST0 to STn sequentially output scan signals SC0 to SCn at a high level in each of the frames F1, F2, and F3.

In the low power mode L-MODE, the masking signal MS is changed from a high level to a low level every frame. According to some embodiments, for example, while the masking signal MS is maintained at the high level in the fourth frame F4, the scan signals SC0 to SC1920 may be sequentially output at the high level. When the masking signal MS is changed to the low level in the fourth frame F4, the scan signals SC1921 to SC3840 are maintained at the low level.

Figure 7:
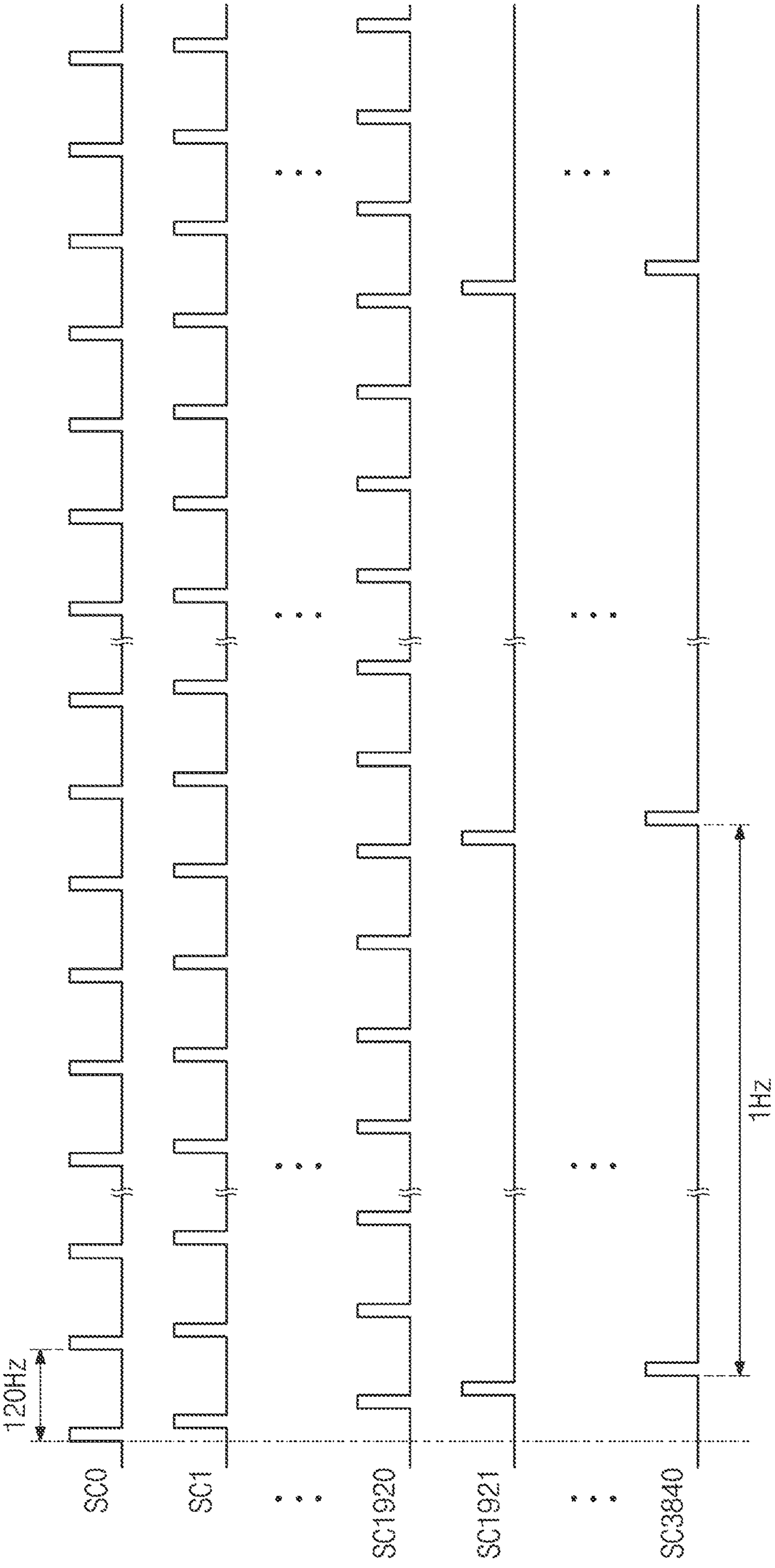
FIG. 7 shows scan signals in a low power mode.

FIG. 7 shows scan signals SC0 to SC3840 in a low power mode.

Referring to FIG. 7, in the low power mode, the frequency of scan signals SC0 to SC1920 is 120 Hz, and the frequency of scan signals SC1921 to SC3840 is 1 Hz.

According to some embodiments, for example, the scan signals SC0 to SC1920 correspond to the first display area DA1 of the display device DD illustrated in FIG. 1, and the scan signals SC1921 to SC3840 correspond to the second display area DA2. The first display area DA1 in which the video is displayed is driven by scan signals SC0 to SC1920 of a normal frequency (e.g., 120 Hz), and the second display area DA2 in which a still image is displayed is driven by scan signals SC1921 to SC3840 of a low frequency (e.g., 1 Hz). Because only the second display area DA2 in which the still image is displayed is driven at a low frequency, power consumption can be reduced without deteriorating the display quality of the display device DD (refer to FIG. 1). In the low power mode, some of the scan signals SC0 to SC3840 are driven at a normal frequency and some of the scan signals SC0 to SC3840 are driven at a low frequency, so the low power mode may be referred to as a multi-frequency mode.

Figure 8:
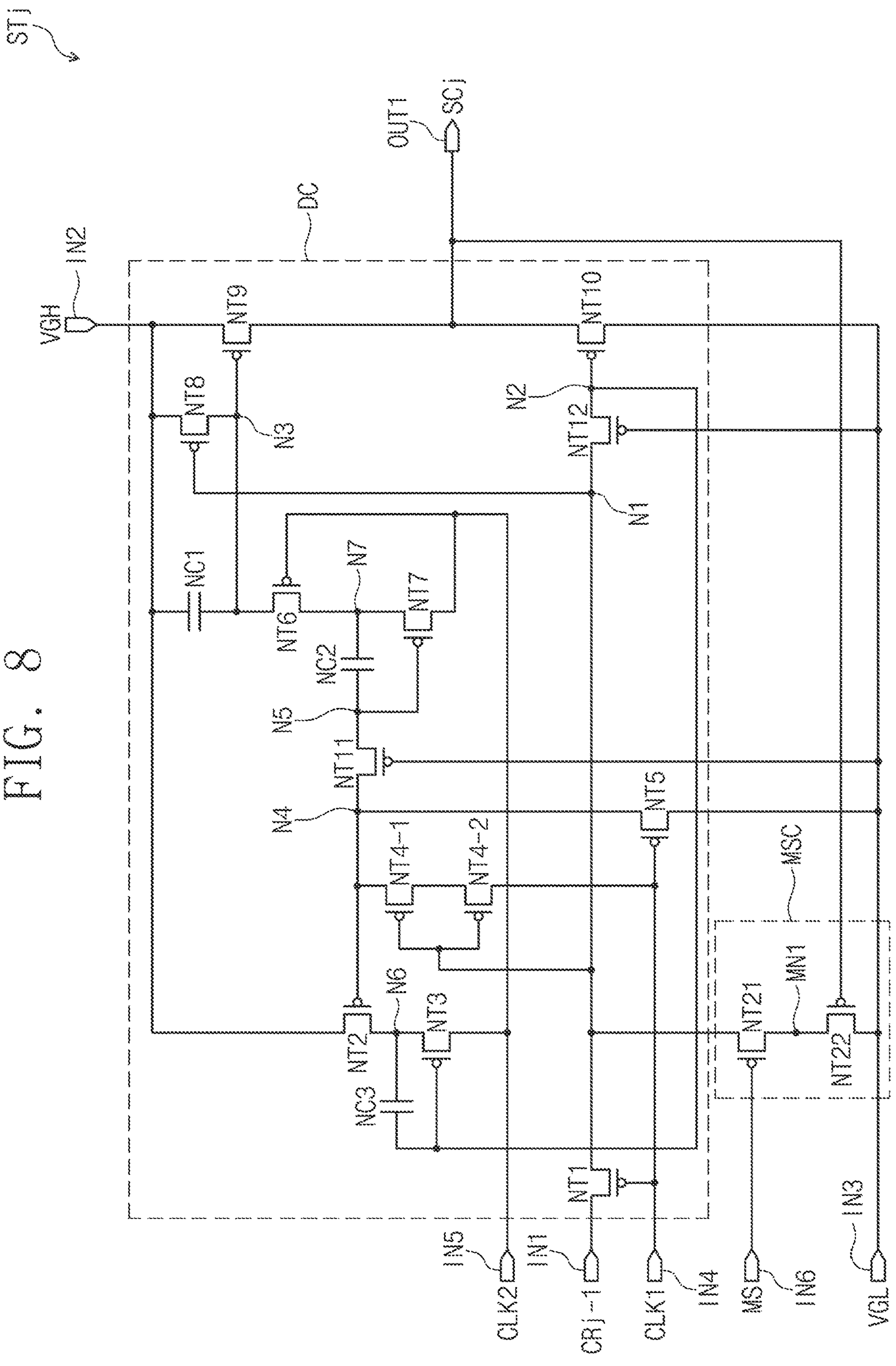
FIG. 8 is a circuit diagram showing a j-th driving stage STj in a scan driving circuit according to some embodiments of the inventive concept.

FIG. 8 is a circuit diagram illustrating a j-th driving stage STj in the first scan driving circuit SD1 according to some embodiments of the inventive concept.

FIG. 8 illustrates a of a j-th driving stage STj (j is a positive integer) among the driving stages ST0 to STn illustrated in FIG. 5. Each of the plurality of driving stages ST0 to STn illustrated in FIG. 5 may include the same circuit configuration as the j-th driving stage STj illustrated in FIG. 8. Hereinafter, the j-th driving stage STj is referred to as a driving stage STj.

Referring to FIG. 8, the driving stage STj includes a driving circuit DC, a masking circuit MSC, first to sixth input terminals IN1-IN6, and an output terminal OUT1.

The driving circuit DC includes transistors NT1 to NT12 and capacitors NC1 to NC3. Each of the transistors NT1-NT12 is illustrated and described as a P-type transistor, but embodiments according to the inventive concept are not limited thereto. Some or all of the transistors NT1-NT12 may be N-type transistors.

The driving circuit DC receives a carry signal CRj−1, a first clock signal CLK1, a second clock signal CLK2, a first voltage VGL, and a second voltage VGH through the first to fifth input terminals IN1 to IN5, and outputs the scan signal SCj through the output terminal OUT1.

The carry signal CRj−1 received through the first input terminal IN1 may be a scan signal SCj−1 output from the previous driving stage STj−1 shown in FIG. 5. The carry signal CRj−1 of the driving stage ST0 illustrated in FIG. 5 may be a start signal FLM.

The fourth input terminal IN4 of each of some of the driving stages ST0 to STn illustrated in FIG. 5 (e.g., odd-numbered driving stages) receives the first clock signal CLK1, and the fifth input terminals IN5 receive the second clock signal CLK2. In addition, the fourth input terminal IN4 of each of some of the driving stages ST0 to STn (e.g., even-numbered driving stages) receives the second clock signal CLK2, and the fifth input terminals IN5 receive the first clock signal CLK1.

The transistor NT1 is connected between the first input terminal IN1 and the first node N1, and includes a gate electrode connected to the fourth input terminal IN4. The transistor NT2 is connected between the second input terminal IN2 and the sixth node N6, and includes a gate electrode connected to the fourth node N4. The transistor NT3 is connected between the sixth node N6 and the fifth input terminal IN5, and includes a gate electrode connected to the second node N2.

The transistors NT4-1 and NT4-2 are connected in series between the fourth node N4 and the fourth input terminal IN4. Each of the transistors NT4-1 and NT4-2 includes a gate electrode connected to the first node N1. The transistor NT5 is connected between the fourth node N4 and the third input terminal IN3 and includes a gate electrode connected to the fourth input terminal IN4. The transistor NT6 is connected between the third node N3 and the seventh node N7, and includes a gate electrode connected to the fifth input terminal IN5. The transistor NT7 is connected between the seventh node N7 and the fifth input terminal IN5, and includes a gate electrode connected to the fifth node N5.

The transistor NT8 is connected between the second input terminal IN2 and the third node N3, and includes a gate electrode connected to the first node N1. The transistor NT9 is connected between the second input terminal IN2 and the output terminal OUT1, and includes a gate electrode connected to the third node N3. The transistor NT10 is connected between the output terminal OUT1 and the third input terminal IN3 and includes a gate electrode connected to the second node N2. The transistor NT11 is connected between the fourth node N4 and the fifth node N5 and includes a gate electrode connected to the third input terminal IN3. The transistor NT12 is connected between the first node N1 and the second node N2 and includes a gate electrode connected to the third input terminal IN3.

The capacitor NC1 is connected between the second input terminal IN2 and the third node N3. The capacitor NC2 is connected between the fifth node N5 and the seventh node N7. The capacitor NC3 is connected between the sixth node N6 and the second node N2.

The masking circuit MSC includes transistors NT21 and NT22. The masking circuit MSC may stop (or mask) the output of the scan signal SCj in response to the masking signal MS and the scan signal SCj received through the sixth input terminal IN6.

The transistor NT21 is connected between the first node N1 and the masking node MN1 and includes a gate electrode connected to the sixth input terminal IN6. The transistor NT22 is connected between the masking node MN1 and the third input terminal IN3 and includes a gate electrode connected to the output terminal OUT1.

Figure 9:
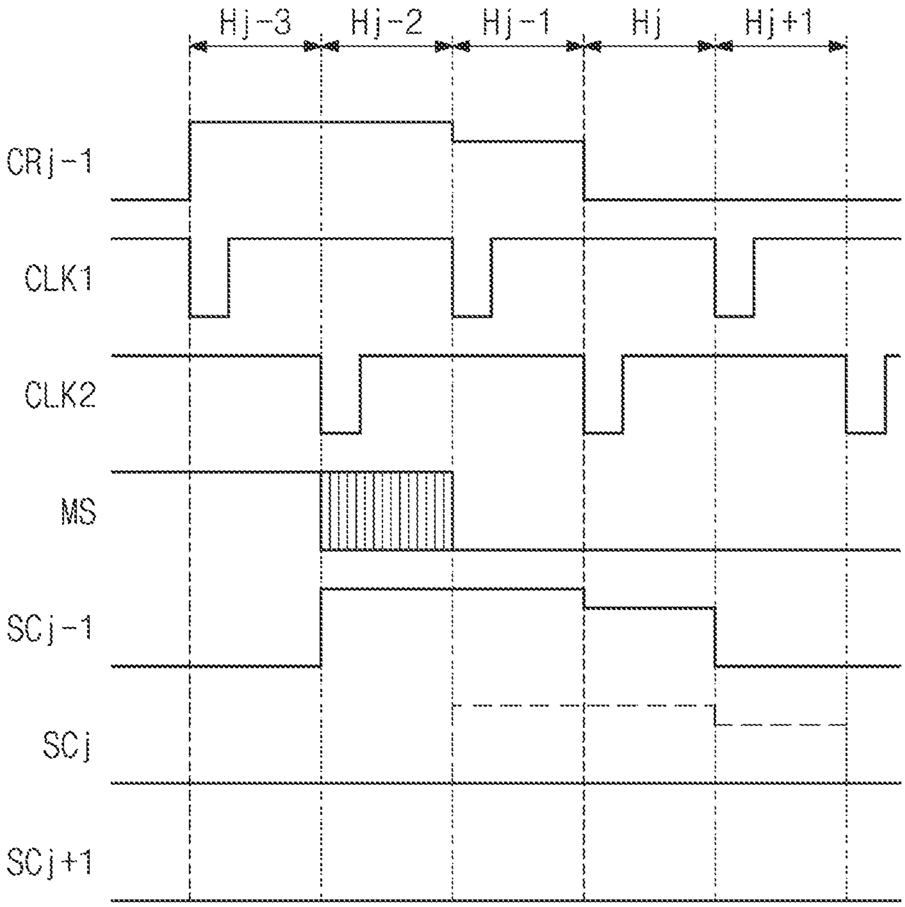
FIG. 9 is a timing diagram illustrating operations of a (j−1)-th driving stage and a j-th driving stage in a low power mode.

FIG. 9 is a timing diagram showing operations of the (j−1)-th driving stage STj−1 and the j-th driving stage STj in the low power mode.

Referring to FIGS. 8 and 9, the first clock signal CLK1 and the second clock signal CLK2 are signals having the same frequency and transitioning to an active level (e.g., a low level) in different horizontal sections H. The horizontal section H is a time when the pixels PX in one row in the first direction DR1 of the display panel DP (refer to FIG. 2) are driven.

While the masking signal MS is at a high level, because the transistor NT21 in the masking circuit MSC of the (j−1)-th driving stage STj−1 maintains a turned off state, the (j−1)-th driving stage STj−1 may output the (j−1)-th scan signal SCj−1 in response to the carry signal CRj−1, the first clock signal CLK1, and the second clock signal CLK2.

When the masking signal MS transitions from the high level to the low level in the (j−2)-th horizontal section Hj−2, the transistor NT21 in the masking circuit MSC of the (j−1)-th driving stage STj−1 is turned on. At this time, because the (j−1)-th driving stage STj−1 already outputs the (j−1)-th scan signal SCj−1 of the high level, the transistor NT22 in the masking circuit MSC may be maintained in a turned off state. Therefore, the (j−1)-th driving stage STj−1, which outputs the (j−1)-th scan signal SCj−1 that is already activated at the high level, can normally output the (j−1)-th scan signal SCj−1.

When the masking signal MS transitions from the high level to the low level in the (j−2)-th horizontal section Hj−2, the transistor NT21 in the masking circuit MSC of the j-th driving stage STj is turned on. Also, the transistor NT22 may be turned on in response to the low-level j-th scan signal SCj. As the transistor NT22 is turned on, the first node N1 is discharged (or sinked) as the first voltage VGL through the third input terminal IN3.

In a state in which the first node N1 is electrically connected to the third input terminal IN3, even if the carry signal CRj−1, that is, the (j−1)-th scan signal SCj−1 from the previous stage STj−1, transitions to the high level, the first node N1 is maintained at a low level. As each of the first node N1 and the second node N2 is maintained at the low level, the transistor NT10 is turned on, so that the output terminal OUT1 outputs the low-level j-th scan signal SCj. While the transistors NT21 and NT22 are turned on, the j-th scan signal SCj may be maintained at a low level.

The (j+1)-th driving stage STj+1 receiving the low-level j-th scan signal SCj as the carry signal CRj outputs the low-level (j+1)-th scan signal SCj+1.

As shown in FIGS. 8 and 9, when the masking signal MS transitions from a high level to a low level, a scan signal (e.g., the (j−1)-th scan signal SCj−1) that has already transitioned to a high level may be normally output.

In this way, when the (j−1)-th scan signal SCj−1 is an active level (e.g., a high level) and the masking signal MS transitions from a high level to a low level in the (j−2)-th horizontal section Hj−2 where the j-th scan signal SCj is an inactive level (e.g., a low level), the j-th scan signal SCj may be masked.

When the masking signal MS transitions from a high level to a low level, the low-level scan signals (e.g., the j-th scan signal SCj and the (j+1)-th scan signal SCj+1) are maintained at the low level. Therefore, the output of the scan signal can be stopped (or masked) by adjusting the change time point of the masking signal MS.

Figure 10:
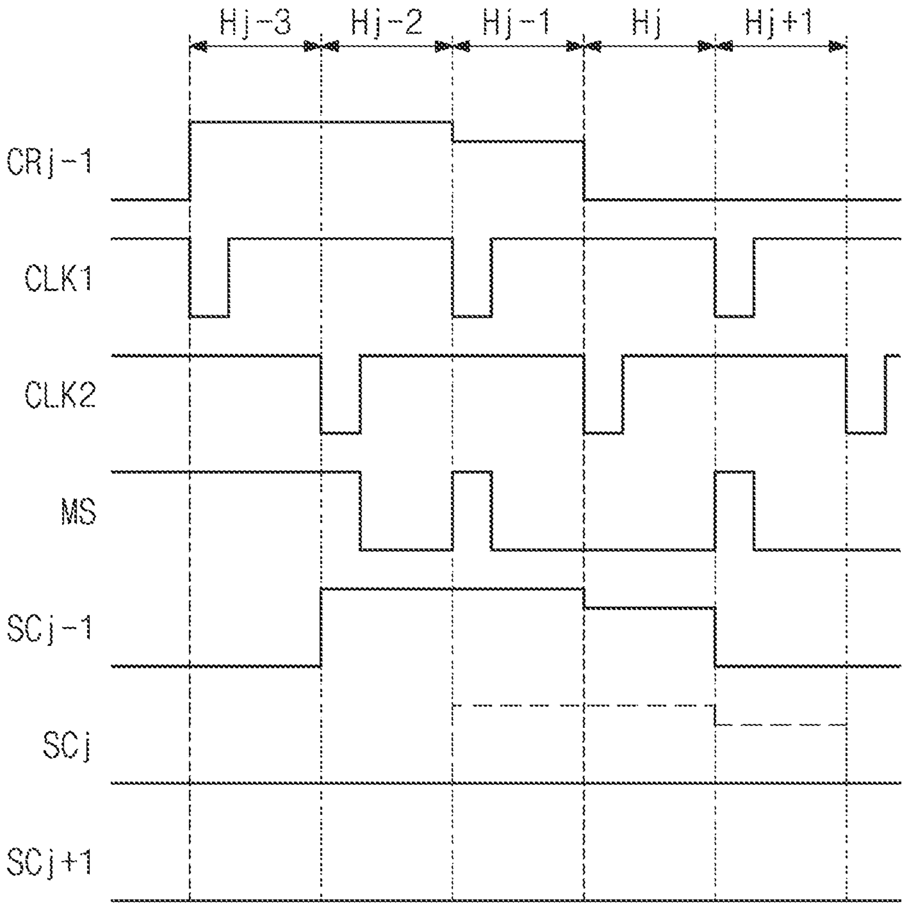
FIG. 10 is a timing diagram illustrating a operation of a j-th driving stage in a low power mode.

FIG. 10 is a timing diagram illustrating an operation of a j-th driving stage STj in a low power mode.

Referring to FIGS. 8 and 10, if the masking signal MS is at a low level in the (j−1)-th horizontal section Hj−1, the transistor NT21 in the masking circuit MSC of the j-th driving stage STj is turned on. Also, the transistor NT22 may be turned on in response to the low-level j-th scan signal SCj. As the transistor NT22 is turned on, the first node N1 is discharged (or sinked) as the first voltage VGL through the third input terminal IN3. At this time, when the first clock signal CLK1 transitions to the low level, a current path is formed between the first input terminal IN1 and the third input terminal IN3 through the transistors NT1, NT21, and NT22 so that the carry signal CRj−1 may be discharged as the first voltage VGL. According to some embodiments, when the first clock signal CLK1 transitions to the low level, the masking signal MS may be toggled to the high level. As a result, it is possible to prevent or reduce instances of a current path being formed between the first input terminal IN1 and the third input terminal IN3.

Figure 11:
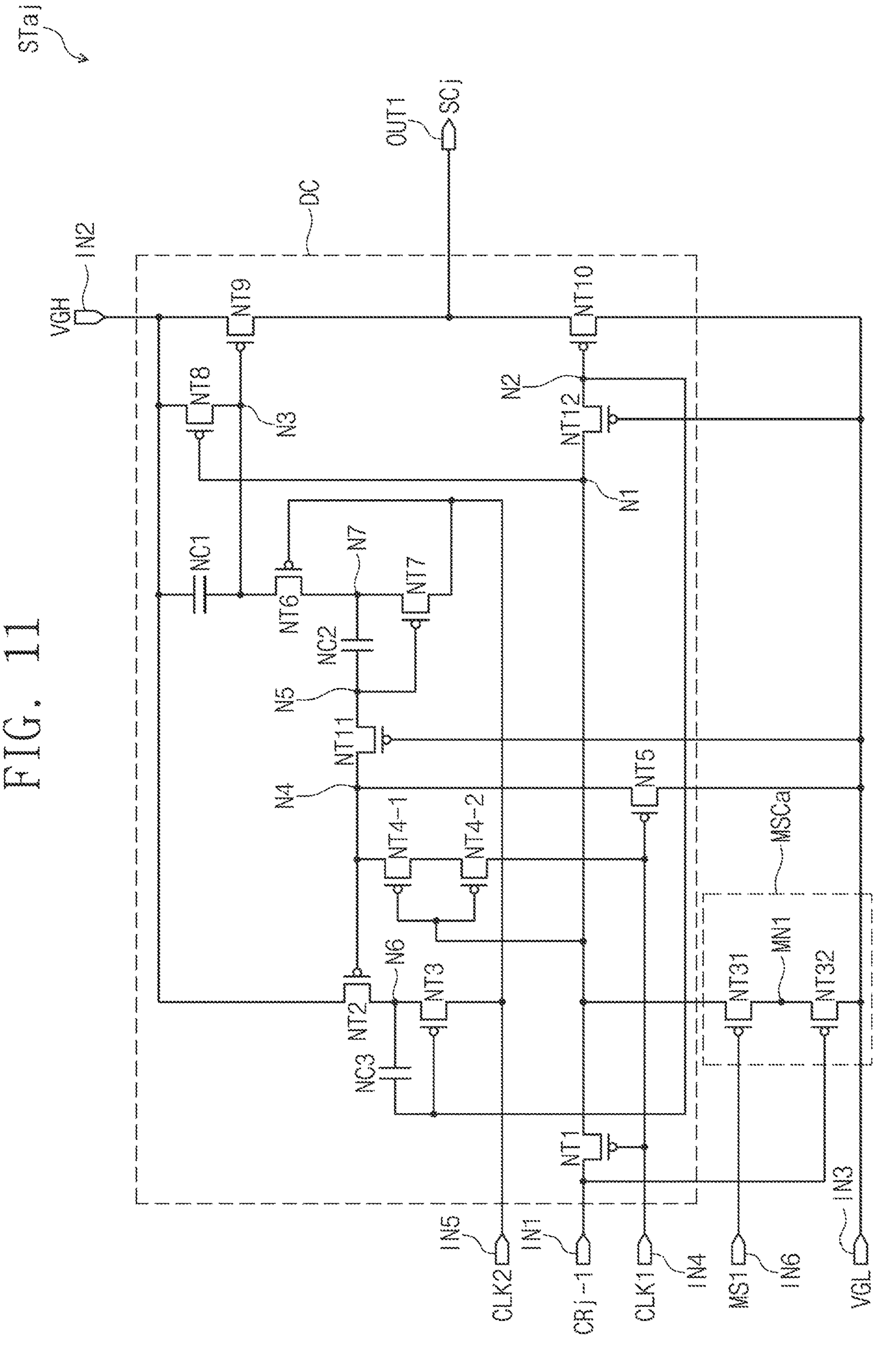
FIG. 11 is a circuit diagram showing a j-th driving stage in a scan driving circuit according to some embodiments of the inventive concept.

FIG. 11 is a circuit diagram showing a j-th driving stage STaj in a scan driving circuit according to some embodiments of the inventive concept.

Because the driving circuit DC of the driving stage STaj shown in FIG. 11 has the same configuration as the driving circuit DC of the driving stage STj shown in FIG. 8, the same reference numeral is added, and duplicate descriptions are omitted.

The driving stage STaj includes a masking circuit MSCa. The masking circuit MSCa includes transistors NT31 and NT32. The masking circuit MSCa may stop (or mask) the output of the scan signal SCj in response to the masking signal MS1 and the carry signal CRj−1 received through the sixth input terminal IN6.

The transistor NT31 is connected between the first node N1 and the masking node MN1 and includes a gate electrode connected to the sixth input terminal IN6. The transistor NT32 is connected between the masking node MN1 and the third input terminal IN3, and includes a gate electrode connected to the first input terminal IN1.

The gate electrode of the transistor NT22 in the masking circuit MSC shown in FIG. 8 is connected to the output terminal OUT1, but the gate electrode of the transistor NT32 in the masking circuit MSCa shown in FIG. 11 is connected to the first input terminal IN1.

Figure 12:
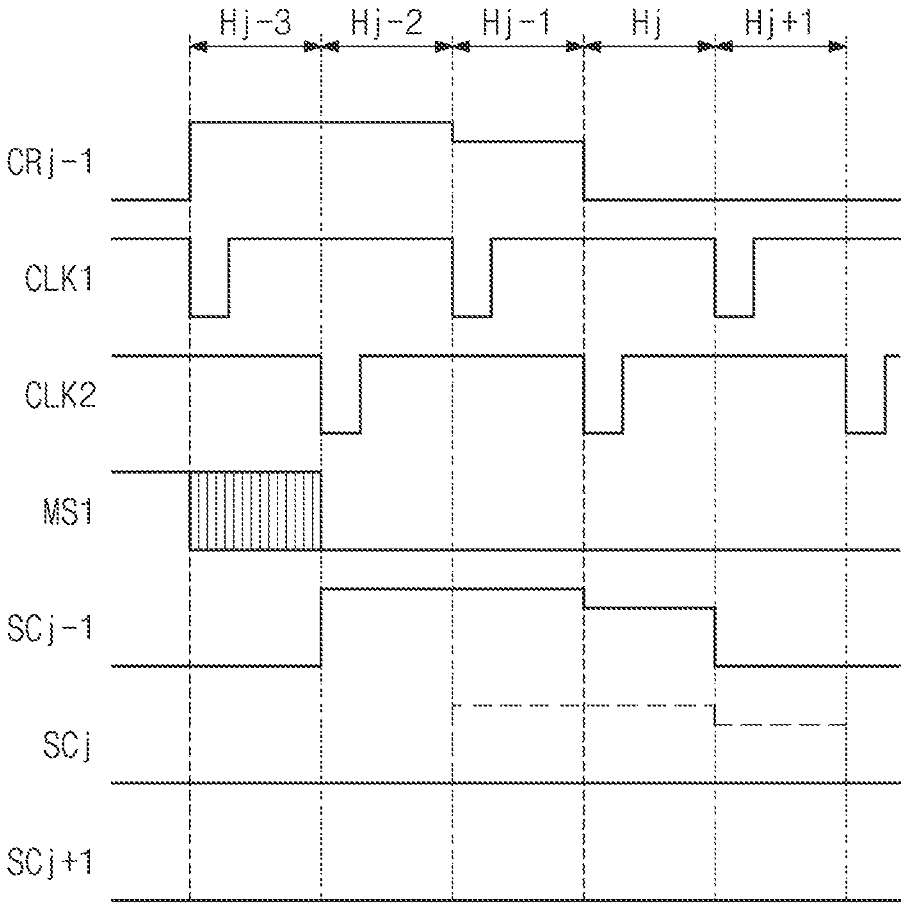
FIG. 12 is a timing diagram illustrating a operation of a j-th driving stage in a low power mode.

FIG. 12 is a timing diagram illustrating a operation of a j-th driving stage STaj in a low power mode.

Referring to FIGS. 11 and 12, when it is to mask the j-th scan signal SCj output from the j-th driving stage STaj to a low level, the masking signal MS1 must transition from the high level to the low level during the (j−3)-th horizontal section Hj−3.

When the masking signal MS1 is at a low level in the (j−3)-th horizontal section Hj−3, the transistor NT31 in the masking circuit MSCa of the j-th driving stage STj is turned on. In addition, the transistor NT32 may also be turned on in response to the low-level carry signal CRj−1 (i.e., the (j−1)-th scan signal SCj−1). As the transistor NT32 is turned on, the first node N1 is discharged as the first voltage VGL through the third input terminal IN3, and the output terminal OUT1 is discharged as the first voltage VGL through the transistor NT10. As a result, the j-th scan signal SCj is maintained at the low level.

When the carry signal CRj−1 (i.e., the (j−1)-th scan signal SCj−1) transitions to the high level in the (j−2)-th horizontal section Hj−2, because the first clock signal CLK1 is at a high level, the first node N1 and the second node N2 may be maintained at a low level. Meanwhile, as the first node N1 is maintained at a low level, because the transistor NT8 is maintained in a turned-on state, the node N3 is at a high level, and the transistor NT9 is not turned on. Accordingly, the j-th scan signal SCj may be maintained at a low level.

When the first clock signal CLK1 transitions to the low level in the (j−1)-th horizontal section Hj−1, the high-level carry signal CRj−1 (i.e., the (j−1)-th scan signal SCj−1) is transmitted to the first node N1 and the second node N2. The transistor NT10 is turned off in response to a signal from the second node N2 of the high level. The transistor NT8 is turned off in response to a signal of the first node N1 having a high level, but the third node N3 may be maintained at a high level by the capacitor NC1. As a result, the j-th scan signal SCj is maintained at the low level.

When the second clock signal CLK2 transitions to the low level in the j-th horizontal section Hj, the second node N2 changes to a low level of a lower voltage by the capacitor NC2, so that the transistor NT10 is turned on. Therefore, the j-th scan signal SCj is maintained at a low level.

When the first clock signal CLK1 transitions to the low level in the j+1th horizontal section Hj+1, the low-level carry signal CRj−1 (i.e., the (j−1)-th scan signal SCj−1) is transmitted to the first node N1 and the second node N2. The transistor NT9 is not turned on as the transistor NT8 is turned on in response to a signal from the low-level first node N1. As the transistor NT10 is turned on in response to a signal from the second node N2 of the low level, the j-th scan signal SCj is maintained at the low level.

In this way, when the (j−2)-th scan signal SCj−2, that is, the carry signal SCj−2, is the active level (e.g., high level) and the masking signal MS1 transitions from a high level to a low level in the (j−3)-th horizontal section Hj−3 where the (j−1)-th scan signal SCj−1, that is, the carry signal SCj−1, is at an inactive level (e.g., low level), the j-th scan signal SCj may be masked.

Figure 13:
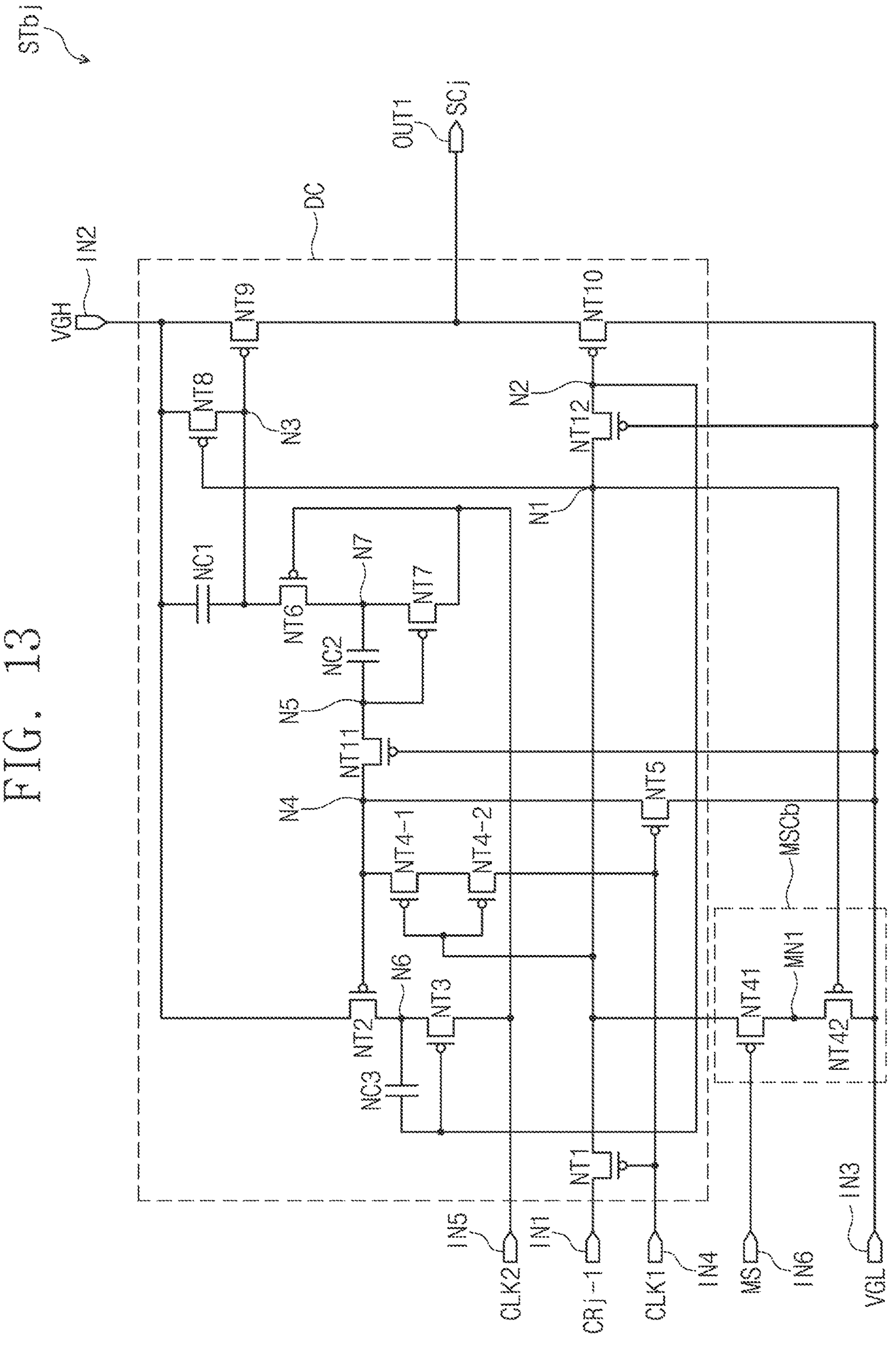
FIG. 13 is a circuit diagram showing a j-th driving stage in a scan driving circuit according to some embodiments of the inventive concept.

FIG. 13 is a circuit diagram showing a j-th driving stage STbj in a scan driving circuit according to some embodiments of the inventive concept.

Because the driving circuit DC of the driving stage STbj shown in FIG. 13 has the same configuration as the driving circuit DC of the driving stage STj shown in FIG. 8, the same reference numeral is added, and duplicate descriptions are omitted.

The driving stage STbj includes a masking circuit MSCb. The masking circuit MSCb includes transistors NT41 and NT42. The masking circuit MSCb may stop (or mask) the output of the scan signal SCj in response to the masking signal MS received through the sixth input terminal IN6 and the signal of the first node N1.

The transistor NT41 is connected between the first node N1 and the masking node MN1 and includes a gate electrode connected to the sixth input terminal IN6. The transistor NT42 is connected between the masking node MN1 and the third input terminal IN3, and includes a gate electrode connected to the first node N1.

The gate electrode of the transistor NT22 in the masking circuit MSC shown in FIG. 8 is connected to the output terminal OUT1, but the gate electrode of the transistor NT42 in the masking circuit MSCb shown in FIG. 13 is connected to the first node N1.

The signal of the first node N1 is similar to the carry signal CRj−1. Accordingly, the masking circuit MSCb operating in response to the signal of the first node N1 and the masking signal MS may operate similarly to the masking circuit MSCa shown in FIG. 11.

The masking circuit MSC illustrated in FIG. 8 may stop the driving circuit DC from outputting the scan signal SCj in response to the masking signal MS and the scan signal SCj. The masking circuit MSCa illustrated in FIG. 11 may stop the driving circuit DC from outputting the scan signal SCj in response to the masking signal MS1 and the carry signal CRj−1. The masking circuit MSCb illustrated in FIG. 13 may stop the driving circuit DC from outputting the scan signal SCj in response to the masking signal MS and the signal of the first node N1.

The scan signal SCj, the carry signal CRj−1, and the signal of the first node N1 are all signals indicating the operating state of the driving circuit DC. That is, even if the masking signal MS or MS1 is at a low level, when the driving circuit DC outputs the scan signal SCj of an active level (e.g., a high level), the masking circuit MSC, the masking circuit MSCa, and the masking circuit MSCb allow the scan signal SCj of the active level to be normally output.

When the masking signal MS or MS1 is at a low level, if the driving circuit DC is in a state in which the scan signal SCj of an inactive level (e.g., a low level) is output, the masking circuit MSC, the masking circuit MSCa, and the masking circuit MSCb control the driving circuit DC not to output the scan signal SCj of the active level, that is, control the scan signal SCj to be maintained at an inactive level.

As a result, the first scan driving circuit SD1 (refer to FIG. 5) may be driven from the first scan line SL1 to the (j−1)-th scan line SCLj−1 at a normal frequency, and may be driven from the j-th scan line SCLj to the n-th scan line SLn at a low frequency. For example, even if the masking signal MS or MS1 transitions to the low level while the (j−1)-th scan line SCLj−1 is driven in an active level (e.g., high level), the (j−1)-th scan line SCLj−1 may be normally driven by the normal frequency scan signal SCj−1.

Figure 14:
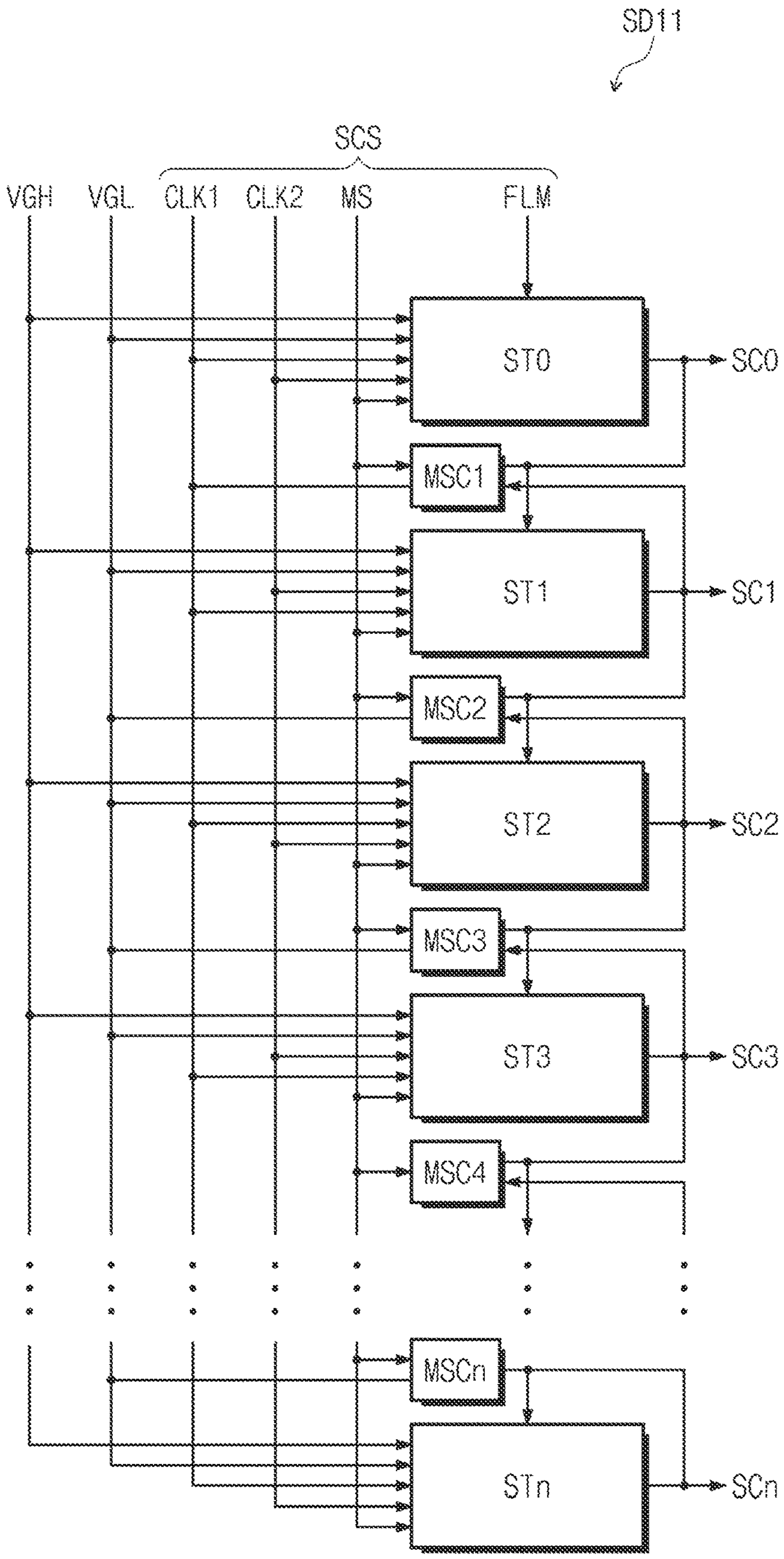
FIG. 14 is a block diagram of a scan driving circuit according to some embodiments of the inventive concept.

FIG. 14 is a block diagram of a first scan driving circuit SD11 according to some embodiments of the inventive concept.

Referring to FIG. 14, a first scan driving circuit SD11 includes driving stages ST0 to STn and masking circuits MSC1 to MSCn. Each of the driving stages ST0 to STn may have the same circuit configuration as the driving stages ST0 to STn in the first scan driving circuit SD1 illustrated in FIG. 5.

The masking circuits MSC1 to MSCn correspond to the driving stages ST1 to STn, respectively. Each of the masking circuits MSC1 to MSCn may selectively provide a scan signal output from the previous driving stage as a carry signal to a corresponding driving stage in response to the masking signal MS and the scan signal output from the corresponding driving stage among driving stages ST0 to STn.

Figure 15:
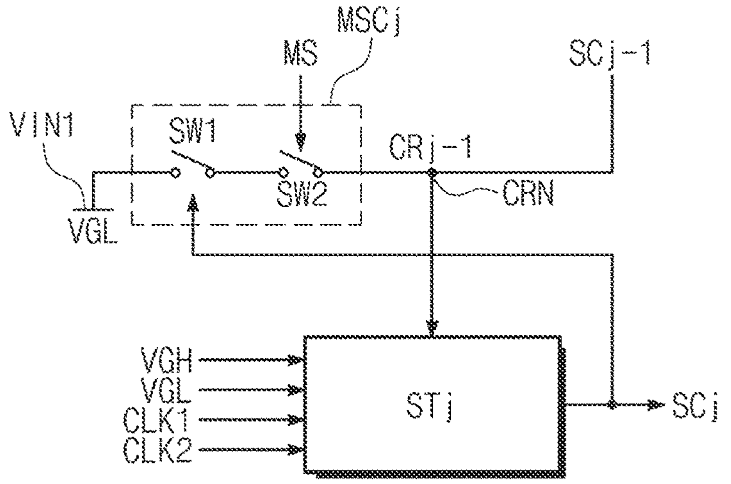
FIG. 15 shows a circuit configuration of a j-th masking circuit corresponding to a j-th driving stage among the masking circuits illustrated in FIG. 14.

FIG. 15 shows a circuit configuration of a j-th masking circuit MSCj corresponding to the j-th driving stage STj among the masking circuits MSC1 to MSCn illustrated in FIG. 14.

Referring to FIG. 15, a j-th masking circuit (hereinafter, masking circuit) MSCj includes a first switch SW1 and a second switch SW2. The first switch SW1 is connected between the voltage terminal VIN1 receiving the first voltage VGL and the second switch SW2, and operates in response to the j-th scan signal SCj. The second switch SW2 is connected between the first switch SW1 and the carry node CRN receiving the carry signal CRj−1, and operates in response to the masking signal MS. The (j−1)-th scan signal SCj−1 output from the previous stage (that is, the (j−1)-th driving stage STj−1), may be provided as a carry signal CRj−1 to the carry node CRN.

If the masking signal MS is at the first level (e.g., high level), because the second switch SW2 is turned off, the carry node CRN and the voltage terminal VIN1 may be electrically separated.

When the masking signal MS is at the second level (e.g., low level), the second switch SW2 is turned on. At this time, if the j-th scan signal SCj is at the first level (e.g., high level), because the first switch SW1 is turned off, the carry node CRN and the voltage terminal VIN1 may be electrically separated. On the other hand, if the j-th scan signal SCj is at the second level (e.g., low level), because the first switch SW1 is turned on, the carry node CRN and the voltage terminal VIN1 may be electrically connected.

In other words, if at least one of the masking signal MS or the j-th scan signal SCj is at the first level (e.g., high level), the carry node CRN and the voltage terminal VIN1 are electrically separated. If both the masking signal MS and the j-th scan signal SCj are at the second level (e.g., low level), both the first switch SW1 and the second switch SW2 are turned on so that the carry node CRN is electrically connected to the voltage terminal VIN1. Therefore, because the carry node CRN is discharged as the first voltage VGL, the j-th driving stage STj may receive a low-level carry signal CRj−1 and output a low-level scan signal STj.

Figure 16:
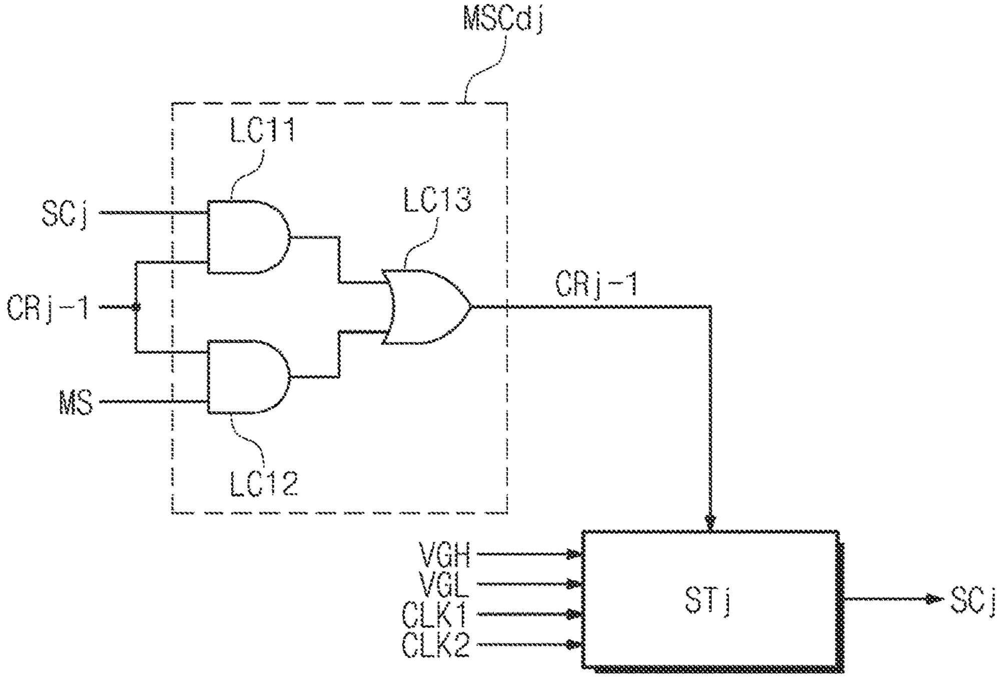
FIG. 16 shows a circuit configuration of a j-th masking circuit corresponding to a j-th driving stage.

FIG. 16 shows a circuit configuration of a j-th masking circuit MSCdj corresponding to a j-th driving stage STj.

Referring to FIG. 16, a j-th masking circuit (hereinafter, masking circuit) MSCdj includes first to third logic circuits LC11 to LC13. The first logic circuit LC11 and the second logic circuit LC12 may be an AND gate circuit, and the third logic circuit LC13 may be an OR gate circuit.

The first logic circuit LC11 receives the j-th scan signal SCj and the carry signal CRj−1 (i.e., the (j−1)-th scan signal SCj−1). The second logic circuit LC12 receives the masking signal MS and the carry signal CRj−1. The third logic circuit LC13 receives the outputs of the first logic circuit LC11 and the second logic circuit LC12 and outputs a (j−1)-th carry signal CRj−1.

When the masking signal MS is a high level, the second logic circuit LC12 may output a signal corresponding to the carry signal CRj−1. Accordingly, the masking circuit MSCdj may provide the carry signal CRj−1 to the driving stage STj while the masking signal MS is at a high level.

When the masking signal MS is at a low level, the second logic circuit LC12 outputs a low level signal, and the first logic circuit LC11 outputs a high level signal when all of the j-th scan signal SCj and the carry signal CRj−1 are at a high level. Accordingly, while the masking signal MS is at a low level, only when both the j-th scan signal SCj and the carry signal CRj−1 are at a high level, the masking circuit MSCdj may provide the high-level carry signal CRj−1 to the driving stage STj.

As described above, the masking circuit MSCdj including logic gate circuits selectively provides the carry signal CRj−1 to the driving stage STj in response to the masking signal MS, the carry signal CRj−1, and the j-th scan signal SCj. In other words, the masking circuit MSCdj illustrated in FIG. 16 may selectively mask the input of the carry signal CRj−1 to the j-th driving stage STj.

The driving stage STj may output the scan signal SCj in response to the carry signal CRj−1, the first voltage VGL, the second voltage VGH, the first clock signal CLK1, and the second clock signal CLK2. When the carry signal CRj−1 is not activated to a high level and is maintained at a low level, the driving stage STj outputs a low-level scan signal SCj. Accordingly, the scan signals SCj to SCn can be driven at a low frequency from the start point (e.g., the j-th scan line SCLj) of the second display area DA2 (refer to FIG. 1).

Figure 17:
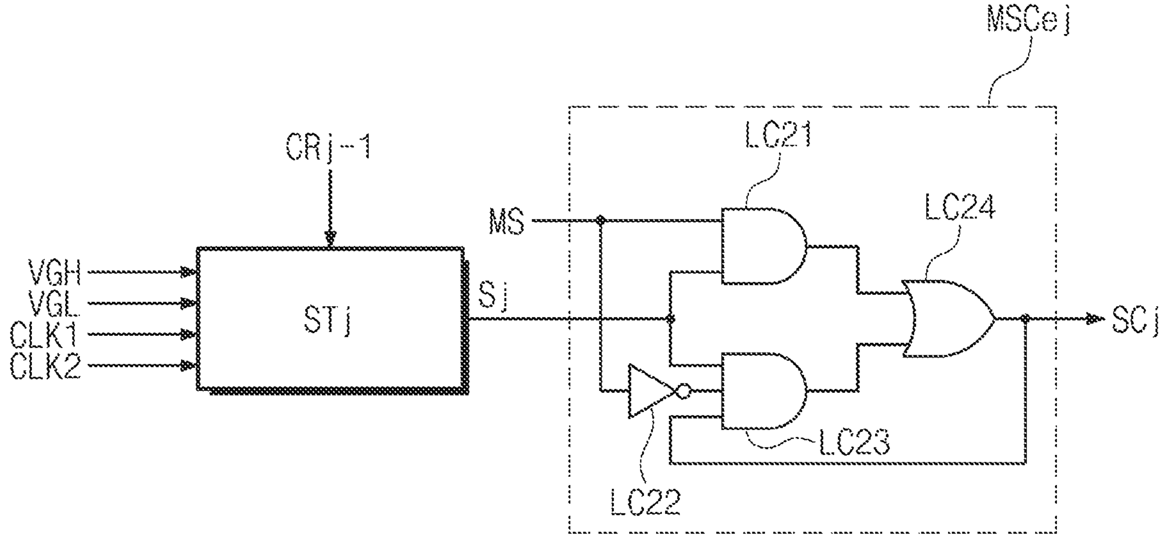
FIG. 17 shows a circuit configuration of a j-th masking circuit corresponding to a j-th driving stage.

FIG. 17 shows a circuit configuration of a j-th masking circuit MSCej corresponding to a j-th driving stage STj.

Referring to FIG. 17, a j-th masking circuit (hereinafter, masking circuit) MSCej includes first to fourth logic circuits LC21 to LC24. The first logic circuit LC21 and the third logic circuit LC23 may be an AND gate circuit, the second logic circuit LC22 may be an inverter circuit, and the fourth logic circuit LC24 may be an OR gate circuit.

The first logic circuit LC21 receives the masking signal MS and the j-th scan signal Sj from the j-th driving stage STj. The second logic circuit LC22 inverts and outputs the masking signal MS. The third logic circuit LC23 receives the j-th scan signal Sj, the inverted masking signal, and the j-th scan signal SCj (or the j-th output scan signal SCj) output from the masking circuit MSCej. The fourth logic circuit LC24 receives the outputs of the first logic circuit LC21 and the third logic circuit LC23, and outputs the j-th scan signal SCj.

When the masking signal MS is at a high level, the first logic circuit LC21 may output the j-th scan signal Sj received from the j-th driving stage STj. Accordingly, the masking circuit MSCej may output the j-th scan signal Sj from the j-th driving stage STj as the j-th scan signal SCj while the masking signal MS is at a high level.

When the masking signal MS is at a low level, the first logic circuit LC21 outputs a low level signal, and when both the j-th scan signal Sj from the j-th driving stage STj and the j-th scan signal SCj from the masking circuit MSCej are at high levels, the third logic circuit LC23 outputs a high level signal. Therefore, only when both the j-th scan signal Sj and the j-th scan signal SCj are at the high level while the masking signal MS is at the low level, the masking circuit MSCej may output the high-level j-th scan signal SCj.

Accordingly, the masking circuit MSCej may output the j-th scan signal Sj from the j-th driving stage STj as the j-scan signal SCj while the masking signal MS is at a high level. In other words, the masking circuit MSCej illustrated in FIG. 17 may selectively mask the output of the j-th driving stage STj.

The driving stage STj may output the j-th scan signal Sj in response to the (j−1)-th carry signal CRj−1, the first voltage VGL, the second voltage VGH, the first clock signal CLK1, and the second clock signal CLK2. Because the masking circuit MSCej selectively outputs the j-th scan signal Sj as the j-th scan signal SCj, the scan signals SCj to SCn may be driven at a low frequency from a start point (e.g., the j-th scan line SCLj) of the second display area DA2 (refer to FIG. 1).

A display device having such a configuration may drive a first display area in which a moving image is displayed and a second display area in which a still image is displayed with different driving frequencies. For example, power consumption can be reduced by lowering the driving frequency of the second display area in which the still image is displayed than the driving frequency of the first display area in which the moving image is displayed.

Although aspects of some embodiments of the inventive concept have been described, it is understood that the inventive concept should not be limited to these embodiments but various changes and modifications can be made by one ordinary skilled in the art within the spirit and scope of the inventive concept as hereinafter claimed.

What is claimed is:

1. A scan driving circuit comprising:

a plurality of driving stages configured to output a plurality of scan signals, respectively; and a masking circuit configured to electrically connect a carry node and a first voltage terminal, wherein each of the driving stages is configured to output a corresponding scan signal from among the plurality of scan signals in response to a carry signal from the carry node, and wherein the masking circuit is configured to discharge the carry signal of the carry node to the first voltage terminal in response to a corresponding scan signal from among the plurality of scan signals and a masking signal.

2. The scan driving circuit of claim 1, wherein the first voltage terminal is configured to receive a first voltage.

3. The scan driving circuit of claim 1, wherein the masking circuit comprises:

a first masking switch configured to electrically connect the carry node and a masking node in response to a masking signal; and a second masking switch configured to electrically connect the masking node and the first voltage terminal in response to the corresponding scan signal from among the plurality of scan signals.

4. The scan driving circuit of claim 3, wherein each of the plurality of driving stages comprises:

a first transistor configured to transmit the carry signal to the carry node in response to a clock signal; and a second transistor configured to connect an output terminal to the first voltage terminal in response to the carry signal of the carry node, wherein the output terminal is configured to output the corresponding scan signal from among the plurality of scan signals.

5. The scan driving circuit of claim 4, wherein each of the plurality of driving stages further comprises:

a third transistor connected between a second voltage terminal configured to receive a second voltage and the output terminal and comprising a gate electrode connected to a second node; and a fourth transistor connected between the second voltage terminal and the second node and comprising a gate electrode connected to the carry node.

6. The scan driving circuit of claim 4, wherein the second masking switch is electrically connected between the masking node and a first voltage terminal and comprises a gate electrode connected to the output terminal of one from among the plurality of driving stages.

7. A scan driving circuit comprising:

a plurality of driving stages configured to output a plurality of scan signals, respectively; and a plurality of masking circuits corresponding to the plurality of driving stages, respectively, wherein a j-th driving stage from among the plurality of driving stages is configured to output a j-th scan signal in response to a (j−1)-th carry signal, wherein a j-th masking circuit from among the plurality of masking circuits is configured to discharge the (j−1)-th carry signal to a first voltage terminal in response to a corresponding scan signal from among the plurality of scan signals and a masking signal.

8. The scan driving circuit of claim 7, wherein a j-th masking circuit is configured to discharge the (j−1)-th carry signal to the first voltage terminal in response to the j-th scan signal or a (j−1)-th scan signal.

9. The scan driving circuit of claim 7, wherein the j-th masking circuit comprises:

a first masking transistor configured to electrically connect a first node and a masking node in response to a masking signal; and a second masking transistor configured to electrically connect the masking node and the first voltage terminal in response to the corresponding scan signal from among the plurality of scan signals.

10. The scan driving circuit of claim 9, wherein the j-th driving stage comprises:

a first transistor configured to transmit the (j−1)-th carry signal to the first node in response to a clock signal; and a second transistor configured to connect an output terminal to the first voltage terminal in response to a signal of the first node, wherein the output terminal is configured to output the j-th scan signal.

11. The scan driving circuit of claim 10, wherein the j-th driving stage further comprises:

a third transistor connected between a second voltage terminal configured to receive a second voltage and the output terminal and comprising a gate electrode connected to a second node; and a fourth transistor connected between the second voltage terminal and the second node and comprising a gate electrode connected to the first node.

12. The scan driving circuit of claim 10, wherein the second masking transistor of the j-th masking circuit is electrically connected between the masking node and a first voltage terminal and comprises a gate electrode connected to the output terminal of the j-th driving stage.

13. The scan driving circuit of claim 9, wherein the second masking transistor of the j-th masking circuit is electrically connected between the masking node and a first voltage terminal and comprises a gate electrode connected to an input terminal configured to receive the (j−1)-th carry signal.

14. A display device comprising:

a display panel comprising a plurality of scan lines; and a scan driving circuit configured to drive the plurality of scan lines, wherein the scan driving circuit comprises:

a plurality of driving stages configured to output a plurality of scan signals to the plurality of scan lines, respectively; and a masking circuit configured to electrically connect a carry node and a first voltage terminal, wherein each of the driving stages is configured to output a corresponding scan signal from among the plurality of scan signals in response to a carry signal from the carry node, wherein the masking circuit is configured to discharge the carry signal of the carry node to the first voltage terminal in response to a corresponding scan signal from among the plurality of scan signals and a masking signal.

15. The display device of claim 14, wherein the display panel comprises a first area and a second area, and wherein the masking signal indicates a scan line corresponding to a start point of the second area from among the plurality of scan lines.

16. The display device of claim 14, wherein the masking circuit comprises:

a first masking switch configured to electrically connect the carry node and a masking node in response to a masking signal; and a second masking switch configured to electrically connect the masking node and the first voltage terminal in response to the corresponding scan signal from among the plurality of scan signals.

17. The display device of claim 16, wherein each of the plurality of driving stages comprises:

a first transistor configured to transmit the carry signal to the carry node in response to a clock signal; and a second transistor configured to connect an output terminal to the first voltage terminal in response to the carry signal of the carry node, wherein the output terminal is configured to output the corresponding scan signal from among the plurality of scan signals.

18. The display device of claim 17, wherein each of the plurality of driving stages further comprises:

a third transistor connected between a second voltage terminal configured to receive a second voltage and the output terminal and comprising a gate electrode connected to a second node; and a fourth transistor connected between the second voltage terminal and the second node and comprising a gate electrode connected to the carry node.

19. The display device of claim 17, wherein the second masking switch is electrically connected between the masking node and a first voltage terminal and comprises a gate electrode connected to the output terminal of one from among the plurality of driving stages.

* * * * *